US012746883B2

(12) United States Patent
Bharwani et al.

(10) Patent No.: US 12,746,883 B2
(45) Date of Patent: Sep. 29, 2026

(54) SYSTEM AND METHOD FOR CAMPSITE MONITORING USING VEHICLE SENSORS

(71) Applicant: RIVIAN IP HOLDINGS, LLC, Plymouth, MI (US)

(72) Inventors: Kiran Ram Bharwani, San Ramon, CA (US); Jeffrey Mitsuo Ota, Morgan Hill, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 183 days.

(21) Appl. No.: 17/954,190

(22) Filed: Sep. 27, 2022

(65) Prior Publication Data

US 2024/0101059 A1 Mar. 28, 2024

(51) Int. Cl.

| | |
|---|---|
| ***B60R 21/01*** | (2006.01) |
| ***B60Q 1/26*** | (2006.01) |
| ***B60Q 5/00*** | (2006.01) |
| ***B60Q 9/00*** | (2006.01) |
| ***H04N 7/18*** | (2006.01) |
| ***H04N 23/50*** | (2023.01) |

(52) U.S. Cl.

CPC ................ *B60R 21/01* (2013.01); *B60Q 1/26* (2013.01); *B60Q 5/005* (2013.01); *B60Q 9/00* (2013.01); *H04N 7/181* (2013.01); *H04N 23/50* (2023.01)

(58) Field of Classification Search

CPC .......... B60R 21/01; B60Q 1/26; B60Q 5/005; B60Q 9/00; H04N 23/50; H04N 7/181

See application file for complete search history.

(56) References Cited

U.S. PATENT DOCUMENTS

| | | | | |
|---|---|---|---|---|
| 2015/0248772 A1* | 9/2015 | Gove | .................... | H04N 23/698 348/158 |
| 2022/0176911 A1* | 6/2022 | Nayak | .................... | B60W 50/14 |
| 2022/0227295 A1* | 7/2022 | Salter | .................... | B60K 13/06 |
| 2022/0248659 A1* | 8/2022 | Salter | .................... | A01M 29/18 |

OTHER PUBLICATIONS

English Translation of CN 114495398 A Author: Han et al. Title: Intelligent Protecting Device And Protecting Method Under Outdoor Unattended Condition Date:May 13, 2022 (Year: 2022).*

English Translation of DE 102017120502 A1 Author: Tong et al. Title: Vehicle Intrusion Detection Via A Surround View Camera Date: Mar. 15, 2018 (Year: 2018).*

English Translation of DE102017120502A1 Title:Vehicle Intrusion Detection Via A Surround View Camera Author: Tong et al. Date: Mar. 15, 2018 (Year: 2018).*

* cited by examiner

*Primary Examiner* — Steven Vu Nguyen

(74) *Attorney, Agent, or Firm* — HG Law LLP

(57) ABSTRACT

Systems and methods are provided for monitoring a predetermined area for animals. One or more sensors of a vehicle are configured to detect a presence of an object and processing circuitry is configured to detect an object approaching the predetermined area. The processing circuitry is further configured to determine that the detected object is an animal and facilitate activation, in response to determining that the object is approaching the predetermined area and that the object is an animal, a vehicle deterrence feature.

16 Claims, 16 Drawing Sheets

700

200

SYSTEM AND METHOD FOR CAMPSITE MONITORING USING VEHICLE SENSORS

INTRODUCTION

The present disclosure is directed to monitoring an area for objects. More specifically, the present disclosure is directed to using vehicle sensors to identify animals and perform one or more vehicle actions in response.

SUMMARY

Vehicles are used for variety of purposes. For example, vehicles can be used for adventure purposes such as for camping. When camping, people may sleep near the vehicle or on the vehicle (e.g., in a tent mounted on vehicle crossbars or over a cargo area) and animals may approach the campsite. For example, an animal such as a bear or raccoon may approach the campsite looking for food while the campers are sleeping. In accordance with the present disclosure, the vehicle is used to determine whether an animal is approaching and activate a response to deter animals (e.g., using sounds or lights to scare away an approaching animal).

In accordance with some embodiments of the present disclosure, system and methods are provided for using at least one sensor of a vehicle to detect a presence of an object. For example, the at least one sensor may include one or more of a RADAR sensor, a LIDAR sensor, an ultrasonic sensor, a camera, or a thermal camera. Processing circuitry can be used to determine whether the object the object is approaching a predetermined area (e.g., a campsite) and whether the object is an animal. In response to determining that the object is approaching the predetermined area and that the object is an animal, processing circuitry may facilitate the activation of a vehicle deterrence feature deter the animal from approaching the predetermined area.

In some embodiments, the predetermined area is located away from the vehicle (e.g., 20 feet from a side the vehicle). The predetermined area may be set based on a user input (e.g., via a vehicle touch screen display) or a vehicle access key location.

In some embodiments, the sensors used by the system and methods may include sensors and sources of data that are used for Advanced Driving Assistance Systems (ADAS). ADAS is generally configured to warn drivers or aid in the avoidance of hazards in order to increase car and road safety while driving. For example, ADAS is used to detect nearby obstacles or driver errors and respond with corresponding warnings or actions. In some embodiments, the processing circuitry classifies the object as a type of animal. The vehicle may select the recommended vehicle deterrence feature (e.g., a light pattern or sound frequency) based on the type of animal. The recommended vehicle deterrence feature may include turning on one or more vehicle lights or making a sound audible to the animal. In some embodiments, a subset of available vehicle lights is selected for turning on as the vehicle deterrence feature based on a location of the animal. The vehicle deterrence feature may also include a first vehicle response when the animal is a first distance away from the predetermined area and a second vehicle response when the animal is a second distance, closer than the first distance, away from the predetermined area.

In some embodiments, a subset of available sensors of the vehicle is selected for use in detecting the presence of objects based on a location of the predetermined area.

In some embodiments, a notification of the approaching animal is sent to a vehicle access key or a nearby vehicle.

In some embodiments, systems and methods are provided for determining whether a user and an animal are approaching each other. For example, processing circuitry can be used to determine the location of a user relative to a location of the animal, based on data from the plurality of sensors on the vehicle. In some embodiments, the processing circuitry uses the plurality of sensors to monitor an environment surrounding the vehicle, including the user and the detected animal. In some embodiments, the processing circuitry determines the location of the user by determining the location of a vehicle access key of the user. The vehicle access key of the user may be one of a digital key on a user device, a key fob, or a near-field communication (NFC) device. When the processing circuitry determines that the animal and user are approaching each other, the processing circuitry sends a notification of the animal to the vehicle access key of the user.

In some embodiments, one or more vehicles that are equipped with sensors to detect objects (e.g., an animal) in or around a predetermined area are able to communicate sensor data between vehicles, in accordance the present disclosure. In some embodiments, a first vehicle and a second vehicle may be communicatively coupled to each other either through a direct wireless connection or by way of a server-hosted network. The predetermined area may be set by a user of first vehicle. While the predetermined area may be monitored by the sensors on the first vehicle, the first vehicle may also receive sensor data from the second vehicle. Therefore, the first vehicle uses sensor data from sensors of the first vehicle and sensor data from sensors of the second vehicle in order to enhance the sensing area of each vehicle and monitor a larger predetermined area for an approaching object.

In some embodiments, the second vehicle may monitor a second predetermined area set by a user of the second vehicle or determined by the processing circuitry of the second vehicle. The processing circuitry of the second vehicle is able to concurrently monitor the second predetermined area as well as send sensor data from the sensors of the second vehicle that monitor the predetermined area of the first vehicle. The processing circuitry in such embodiments, may be distributed across multiple devices (e.g., multiple vehicles such as the first vehicle and the second vehicle, between the first vehicle and the network, or between the first vehicle and a user device).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

In some embodiments, the present disclosure is directed to deterring animals from approaching an area, and more specifically, to using vehicle sensors to identify an approaching animal and facilitating the activation of a vehicle deterrence feature to, for example, deter the animal. In some embodiments, facilitating the activation of the vehicle deterrence feature may include turning on or turning off a light vehicle light, or activating or deactivating an audible sound. In some embodiments, facilitating the activation of the vehicle deterrence feature may also include generating and transmitting a signal that causes the foregoing lights or audible sounds to occur.

For example, when camping, the user of the vehicle may not notice an animal approaching the vehicle or camp. However, sensors of a nearby vehicle such as thermal cameras, ultrasonic sensors, LIDAR sensors, RADAR sensors and cameras can be used to detect an animal as it nears the area. These sensors may capture a detected motion, image or video of an object that is then determined to be an animal or classified as a type of animal by the processing circuitry of the system. Once the animal is detected and/or classified, the user can be notified and/or the vehicle can activate a response to deter the animal from further encroachment. In some embodiments, the vehicle deters the animal by turning on one or more vehicle lights or making an audible sound from a speaker. In some embodiments, the processing circuitry may use a machine learning model that is trained to classify animals from images and videos as well as trained in vehicle deterrence features that most efficiently deter the classified animal, whether using the vehicle lights, speakers or both concurrently.

In some embodiments, the systems and methods of the present disclosure provide a user interface that allows the user to select a predetermined area for the vehicle to monitor for animals. For example, the predetermined area may be an area that is relative to the vehicle and within the visible or detectable range of the sensors on the vehicle. In some embodiments, a first vehicle is able to communicate with a second vehicle in order to receive sensor data from the second vehicle that may not be within the visible or detectable range of the first vehicle. For example, if the first vehicle is communicatively coupled via wireless communication to the second vehicle, the two vehicles can cover a larger range of area to detect animals than a single vehicle and can provide corresponding deterrence effects using audio or lighting effects from either or both vehicles. In some embodiments, the first vehicle is communicatively coupled to more than one other vehicle to aid in the detection and deterrence of animals in or around a predetermined area.

Figure 1:
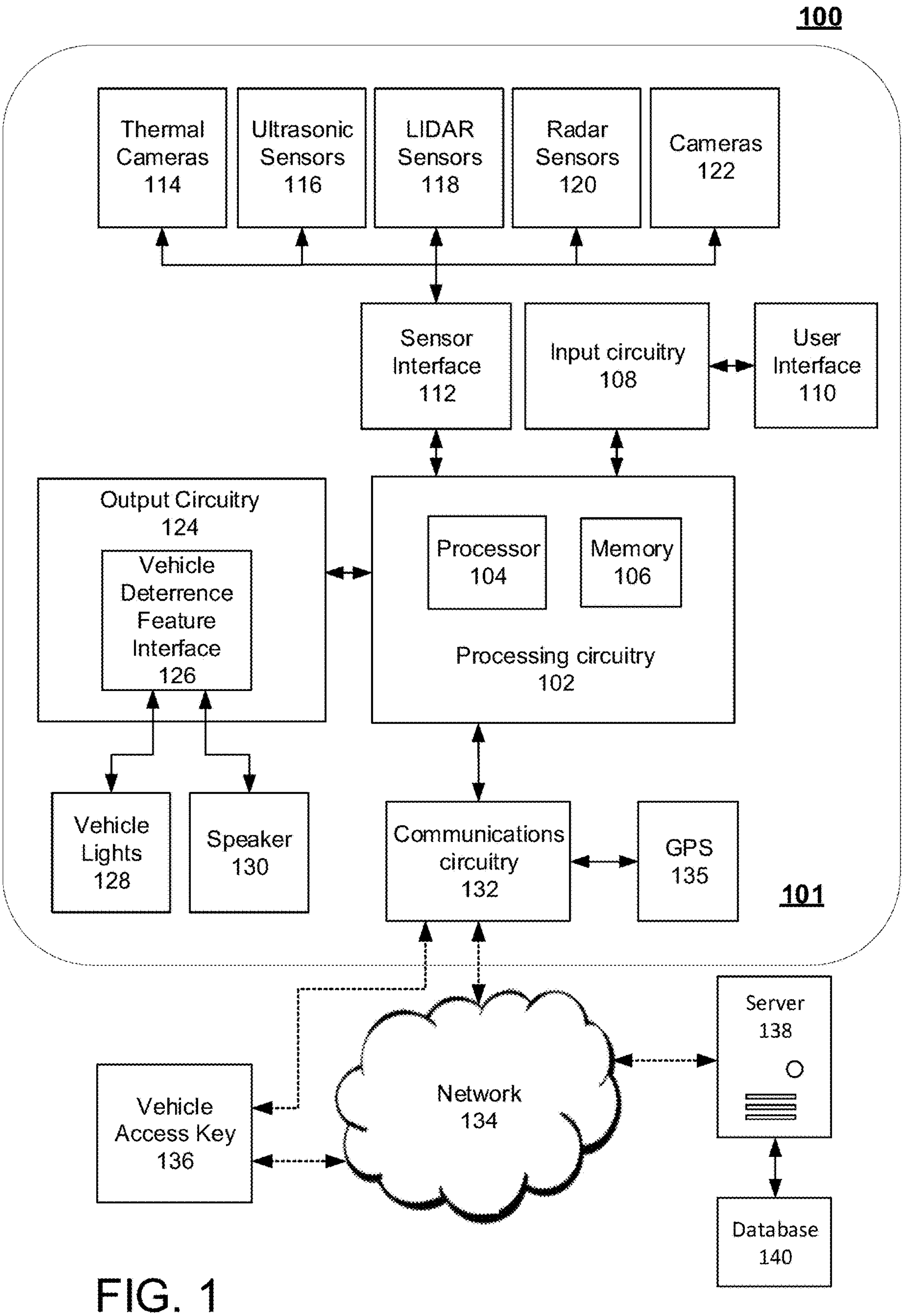
FIG. 1 shows a block diagram of components of a system with processing circuitry for a vehicle to respond to approaching animals based on sensor data, in accordance with some embodiments of the present disclosure.

FIG. 1 shows a block diagram of components of a system 100 with processing circuitry 102 for a vehicle 101 to respond to approaching animals based on sensor data (e.g., ADAS sensor data), in accordance with some embodiments of the present disclosure. In some implementations, the vehicle 101 may be a car (e.g., a coupe, a sedan, a truck, an SUV, a bus), a motorcycle, an aircraft (e.g., a drone), a watercraft (e.g., a boat), or any other type of vehicle. The vehicle comprises processing circuitry 102, which may comprise a processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. The memory 106 may further store sensor data received via the sensor interface 112 as well as data received from the user interface 110 via the input circuitry 108 and database 140 via the communications circuitry 132. In some embodiments, database 140 is hosted by a server 138 and is communicatively reachable by the communications circuitry 132 by a network 134. Processing circuitry 102 may be communicatively connected to components of vehicle 101 via one or more wires, or via wireless connection. In some embodiments, network 134 is a cloud-based network that is communicatively coupled to communications circuitry 132, server 138, and a user device 138, each coupling formed by a wireless connection. In some embodiments, network 134 is used to communicate with database 140 to receive data or system updates from database 140, as well as enable communication with user device 138. In some embodiments, processing circuitry 102 may notify the user or receive location data from user device 138.

Processing circuitry 102 may be communicatively connected to a sensor interface 112, which may be configured to provide a network bus for a set of sensors used on the vehicle. The set of sensors may include thermal cameras 114, ultrasonic sensors 116, LIDAR sensors 118, radar sensors 120, and cameras 122. In some embodiments, to retrieve the sensor data from the set of sensors, the processing circuitry 102 may continuously poll via the sensor interface 112. In alternate embodiments, the set of sensors may detect an object and send an interrupt signal to the processing circuitry 102 to initiate further sensor data retrieval for identification and classification of the object. In some embodiments, one or more of these sensors are used for an advanced driver assistance system (ADAS). For example, radar sensors 120 and cameras 122 may be used for determining when to alert drivers of ADAS feature warnings or performing automatic events to protect the vehicle user while driving. However, the systems and methods of the present disclosure may use some of the same ADAS sensors but for providing user and vehicle 101 protection while the vehicle is parked, whether the user is located inside or located in the surrounding vicinity of vehicle 101. In some embodiments, sensors other than the ADAS sensors may be used for providing user and vehicle 101 protection.

A user interface 110 (e.g., a steering wheel, a touch screen display, buttons, knobs, a microphone, or other audio capture devices, etc.) may be communicatively coupled to the processing circuitry 102 via input circuitry 108. In some embodiments, a user (e.g., driver or passenger) of vehicle 101 may be permitted to select certain settings in connection with the operation of vehicle 101 (e.g., select a predetermined area for the vehicle to protect). In some embodiments, processing circuitry 102 may be communicatively connected to a navigations system, e.g., Global Positioning System (GPS) system 135 via a communications circuitry 132 of vehicle 101, where the user may interact with the GPS system 135 via user interface 110. GPS system 135 may be in communication with multiple satellites to ascertain the vehicle's location and provide the current vehicle location to the processing circuitry 102. As another example, the positioning device may operate on terrestrial signals, such as cell phone signals, Wi-Fi signals, or ultra-wideband signals to determine a location of vehicle 101. The current vehicle location may be in any suitable form such as a geographic coordinate. In some embodiments, processing circuitry 102 uses the current vehicle location to receive relevant animal information of the area surrounding the vehicle 101. The relevant animal information may be received from database 140 through network 134, which may be communicatively reachable by way of the communications circuitry 132.

In some embodiments, processing circuitry 102 may be in communication (e.g., via communications circuitry 132) with a database 140 wirelessly through a server 138 and network 134. In some embodiments, some, or all of the information in database 140 may also be stored locally in memory 106 of vehicle 101. In some embodiments, the communications circuitry is communicatively connected to a vehicle access key 136 (e.g., a digital key on a user device, a key fob, or an NFC device). In some embodiments, the vehicle access key 136 are communicatively coupled by wireless communication directly to the communications circuitry 132 or via the network 134 to database 140. In some embodiments, the communications circuitry 132 transmits notifications to the user via the vehicle access key 136. For example, when the processing circuitry 102 determines an animal approaching a predetermined area, the processing circuitry 102 may send a notification to the vehicle access key 136 via the communications circuitry 132. In some embodiments, processing circuitry 102 may use the location of the vehicle access key 136 to determine the location of the user when determining a recommended vehicle deterrence feature to deter the animal or to send a notification to the user of the animal.

The processing circuitry 102 may also be communicatively connected to output circuitry 124, which is configured to manage a vehicle deterrence feature interface 126. The vehicle deterrence feature interface 126, by way of the output circuitry, may be communicatively connected to vehicle lights 128 and speakers 130 in order to facilitate the activation of a vehicle deterrence feature for an approaching animal as described in further detail below.

It should be appreciated that FIG. 1 only shows some of the components of vehicle 101, and it will be understood that vehicle 101 also includes other elements commonly found in vehicles, e.g., a motor, brakes, wheels, wheel controls, turn signals, windows, doors, etc.

Figure 2:
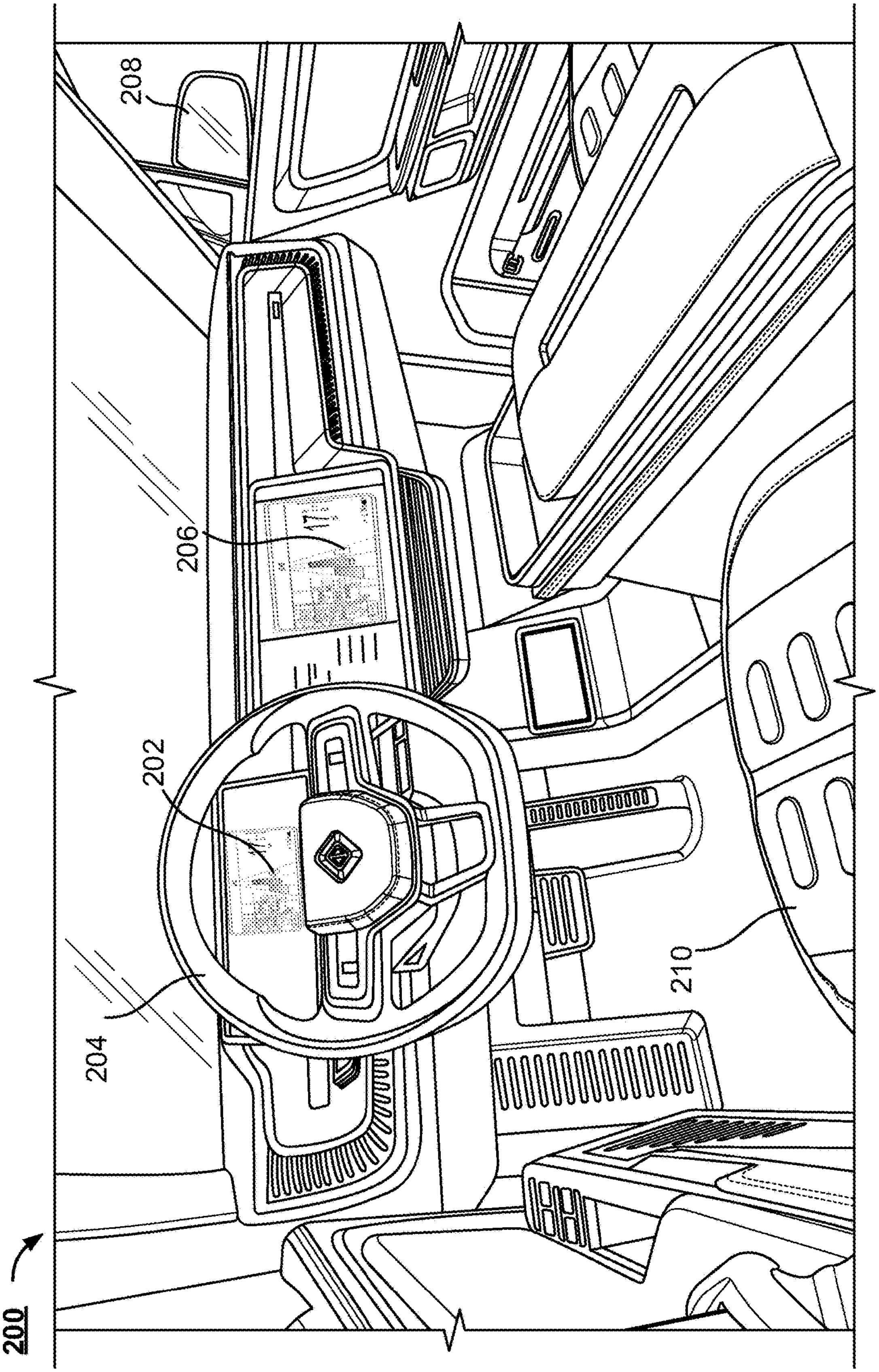
FIG. 2 shows an illustrative depiction of an interior of a vehicle in which user input interfaces and vehicle deterrence feature interface may be provided to a user, in accordance with some embodiments of the present disclosure.

FIG. 2 shows an illustrative depiction of an interior of a vehicle in which user input interfaces and vehicle deterrence feature interface may be provided to a driver, in accordance with some embodiments of the present disclosure. A vehicle interior or vehicle cabin 200 may comprise steering wheel 204, one or more displays 202 and/or 206, and driver seat 210. In some embodiments, the interior 200 of a vehicle may be the interior of vehicle 101 in FIG. 1. In some embodiments, the one or more displays 202 and/or 206 may be used as a user interface via touch screen, knobs, buttons, knobs, a microphone, or other audio capture devices. Processing circuitry 102 may be configured to receive user input by way of the steering wheel 204 or one or more of the displays 202 and/or 206, in order to select a predetermined area for the vehicle 101 to protect. In some embodiments, processing circuitry 102 may generate for display a local navigational view of the vehicle 101 and an interface to select a predetermined area on one or more of the driver display 202 and/or the center display 206 of vehicle 101.

Additionally or alternatively, processing circuitry 102 may be configured to generate for output audio indicators or alerts (e.g., to audibly draw the user's attention to the notification) and/or other visual cues (e.g., conspicuous lighting patterns, such as flashing lights, in an effort to gain the user's attention, such as at light sources located at one or more of steering wheel 204, driver display 202, center display 206, a left side-view mirror, right side-view mirror 208, the rear-view mirror, cabin light, door light, etc.). The audio alerts may be in the form of speech-based instructions and/or an alarm-type indicator transmitted from speakers (e.g., repetitive, high-pitched chimes intended to urgently capture the user's attention). In some embodiments, processing circuitry 102 may generate for output tactile or haptic indicators (e.g., to provide tactile or haptic feedback to a driver, e.g., on driver's seat 210 or a passenger seat).

Figure 3:
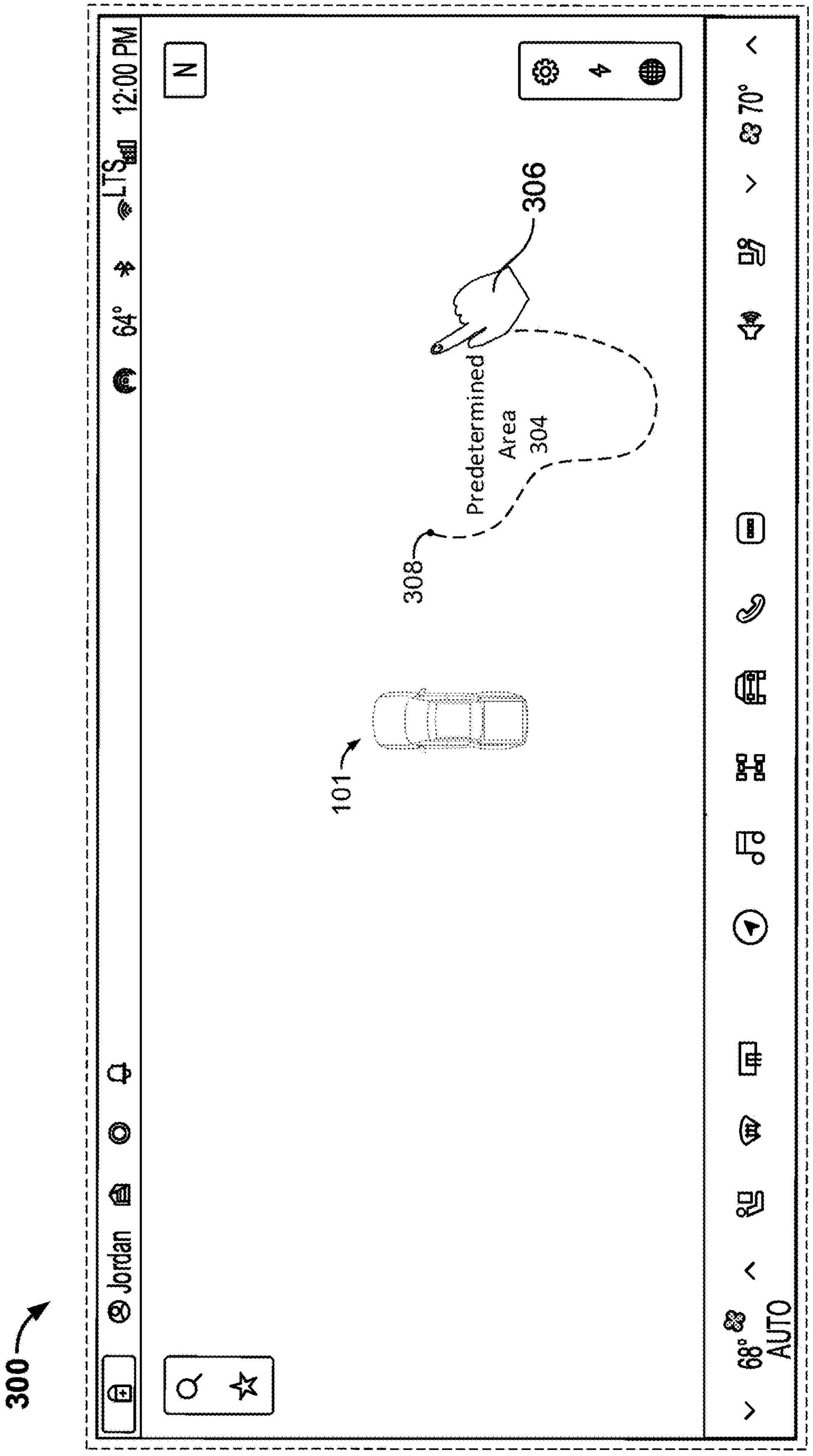
FIG. 3 shows an illustrative mapping interface of a parked vehicle and a predetermined area created by user input, in accordance with some embodiments of the present disclosure.

FIG. 3 shows an illustrative mapping interface 300 of a parked vehicle 101 and a predetermined area 304 created by user input 306, in accordance with some embodiments of the present disclosure. In some embodiments, the mapping interface 300 may be accessed when the vehicle 101 is parked and the user selects a function to set the predetermined area 304 in which the vehicle 101 will monitor for approaching objects. In some embodiments, the predetermined area boundary 308 is drawn or formed by user input 306 on a touch screen, using a mouse, or by one or more buttons (e.g., arrow keys). The mapping interface 300 may be displayed to the user on a display, such as one or more of driver display 202 and/or center display 206 in FIG. 2. As another example, mapping interface 300 may be displayed on user device 138. In some embodiments, the predetermined area 304 may encompass (e.g., surround and include) the vehicle 101 or be located away from vehicle 101 as illustrated. In some embodiments, the user may input more than one predetermined area for the vehicle 101 to monitor. In some embodiments, the vehicle 101 is located near another vehicle, which may be viewable on the mapping interface 300. Once the predetermined area boundary 308 is set (e.g., inputted by the user), the predetermined area 304 can be used by the systems and methods of the present disclosure until changed or stopped by the user or the vehicle 101 is no longer parked in the current vehicle location. In some embodiments, the vehicle 101 may be able to determine a predetermined area 304 without user input 306. In such embodiments, the vehicle 101 may use sensor data to determine where the user is located by using a location of the vehicle access key 136 and set the predetermined region 304 around that location. For example, predetermined region 304 may be a circular region with the location of the vehicle access key 136 at the center of the circular region. The radius or diameter of the circular region may be fixed or may be adjustable by the user. In such embodiments, the predetermined area may move depending on the movement of the user.

Figure 4:
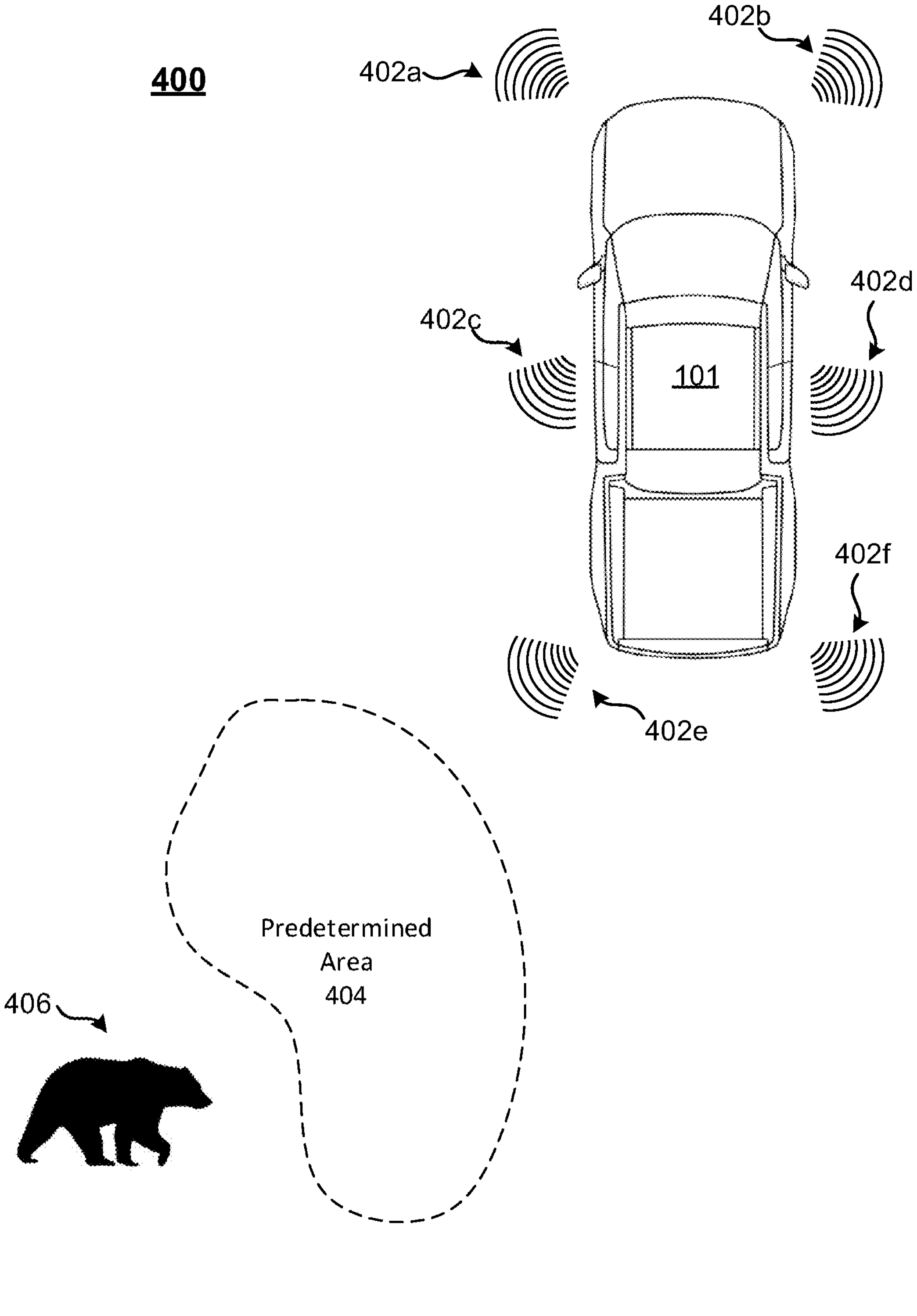
FIG. 4 shows an aerial view of a scenario of a parked vehicle equipped with ADAS sensors to detect objects in or around a predetermined area, in accordance with some embodiments of the present disclosure.

FIG. 4 shows an aerial view of a scenario 400 of a parked vehicle 101 equipped with sensors (e.g., 402*a*, 402*b*, 402*c*, 402*d*, 402*e*, 402*f*, referenced collectively as sensors 402) to detect objects in or around a predetermined area 404, in accordance with some embodiments of the present disclosure. Sensors 402 may include one or more of thermal cameras 114, ultrasonic sensors 116, LIDAR sensors 118, radar sensors 120, or cameras 122 that provide a monitoring view that spans around the whole vehicle 101. In some embodiments, sensors 402 comprises the ADAS sensors of vehicle 101. Each of the sensors 402 may have limitations on the distance that the sensor can capture an image or sense movements. Therefore, the predetermined area 404 selected by the user or determined by the processing circuitry 102 should be within the view of the sensors 402. As previously described, the sensors 402 are used to monitor the predetermined area 404 and the processing circuitry 102 can determine if an object such as object 406 is detected.

In some embodiments, the processing circuitry 102 notifies the user of the presence of a detected object 406. The notifications may vary depending on the location of object 406 and/or the type of object 406. In some embodiments the notifications are sent by way of the communications circuitry 132, which is communicatively coupled to the processing circuitry 102. In some embodiments, the notifications are sent to the vehicle access key 136. In some embodiments, when the object 406 is detected by the processing circuitry 102 (e.g., based on sensor data received from sensors 402), the processing circuitry 102 notifies the user of the detected object 406 with a first level notification (e.g., indicating an object is in the general area). If the processing circuitry 102 determines that the object 406 is approaching the predetermined area 404, the processing circuitry 102 notifies the user of the approaching object with a second level notification (e.g., indicating that the object is approaching the user or the predetermined area 404). In addition, if the processing circuitry 102 determines that the object 406 approaching the predetermined area 404 is an animal such as a dangerous animal, the processing circuitry 102 notifies the user of the dangerous animal approaching the user or predetermined area with a level three notification. In some embodiments, each notification level can vary in how urgent the notification is and how the notification is presented to the user. For example, a higher-level notification may be an audible alert and tactile feedback on the user device, while a lower-level notification may be a visual notification to the user device with less urgency.

In some embodiments, the processing circuitry 102 selects a subset of the plurality of sensors 402 to detect the presence of objects (e.g., object 406) based on a location of the predetermined area 404. For example, in scenario 400, the predetermined area 404 is positioned to the rear, left-side relative to the vehicle 101. In some embodiments, the processing circuitry 102 selects a subset of sensors from the plurality of sensors 402 that monitor the predetermined area 404 and its surroundings (e.g., sensors 402*a*, 402*c*, 402*e* and 402*ef*). As the predetermined area 404 is to the rear, left-side of the vehicle 101, the processing circuitry 102 may exclude the front right-side sensor 402*b* and the middle right-side sensor 402*d* from the selected subset of sensors. In some embodiments, the excluded sensors may transition into a low-power mode, wherein the low-power mode reduces the polling frequency of the excluded sensors from the processing circuitry 102, in order to conserve power. In some embodiments, when a sensor 402 detects an animal, it may cause another sensor to transition out of low-power mode. For example, a LIDAR sensor 118 may detect an object, and therefore activate a camera 122 in order to accrue more information about the object for analyzing and classifying the object.

Figure 5:
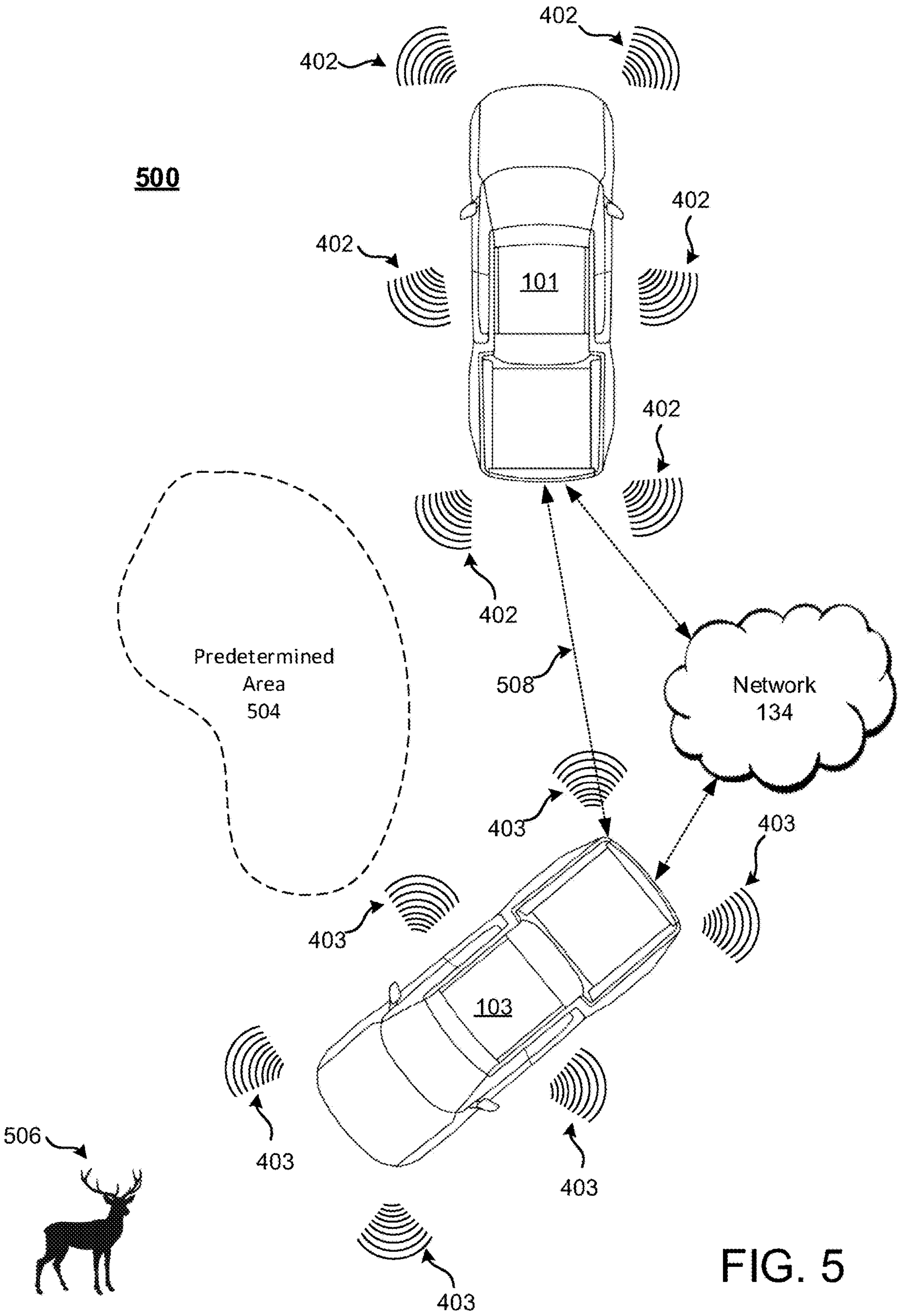
FIG. 5 shows an aerial view of a scenario of two parked vehicles equipped with ADAS sensors to detect objects in or around a predetermined area and having the ability to communicate sensor data between the two vehicles, in accordance with some embodiments of the present disclosure.

FIG. 5 shows an aerial view of a scenario 500 of two parked vehicles 101, 103 equipped with sensors 402, 403 to detect objects (e.g., object 506) in or around a predetermined area 504 and having the ability to communicate sensor data between the two vehicles 101, 103, in accordance with some embodiments of the present disclosure. In some embodiments, the first vehicle 101 and the second vehicle 103 may be communicatively coupled either through direct wireless connection 508 or by way of network 134. In some embodiments of scenario 500, the predetermined area 504 is set by the user of vehicle 101 and may be monitored by sensors 402. In addition, the first vehicle 101 may be in communication with second vehicle 103 to access sensor data from ADAS sensors 403 of the second vehicle 103. Therefore, vehicle 101 uses sensor data from sensors 402 and sensor data from sensors 403 of the second vehicle 103 in order to monitor predetermined area 504 for an approaching object 506. In some embodiments, the second vehicle 103 may have another predetermined area set by the user of the second vehicle 103 or determined by the processing circuitry of the second vehicle 103. Accordingly, the second vehicle 103 may be able to monitor another predetermined area as well as send sensor data from sensors 403 that monitor the predetermined area 504 of the first vehicle 101. Processing circuitry 102 in some embodiments is distributed across multiple devices (e.g., multiple vehicles such as 101/103, between vehicle 101 and network 134, or between vehicle 101 and user device 138).

For example, when monitoring the predetermined area 504, if the object 506 is detected by sensors 403 on the second vehicle 103, a signal may be sent to the processing circuitry 102 of vehicle 101 via the communications circuitry 132. In some embodiments, the line of communication 508 between the first vehicle 101 and the second vehicle 103 provides added sensor support to detect the object 506, detect if the object 506 is approaching the predetermined area 504 or to determine whether the object 506 is an animal.

Figure 6:
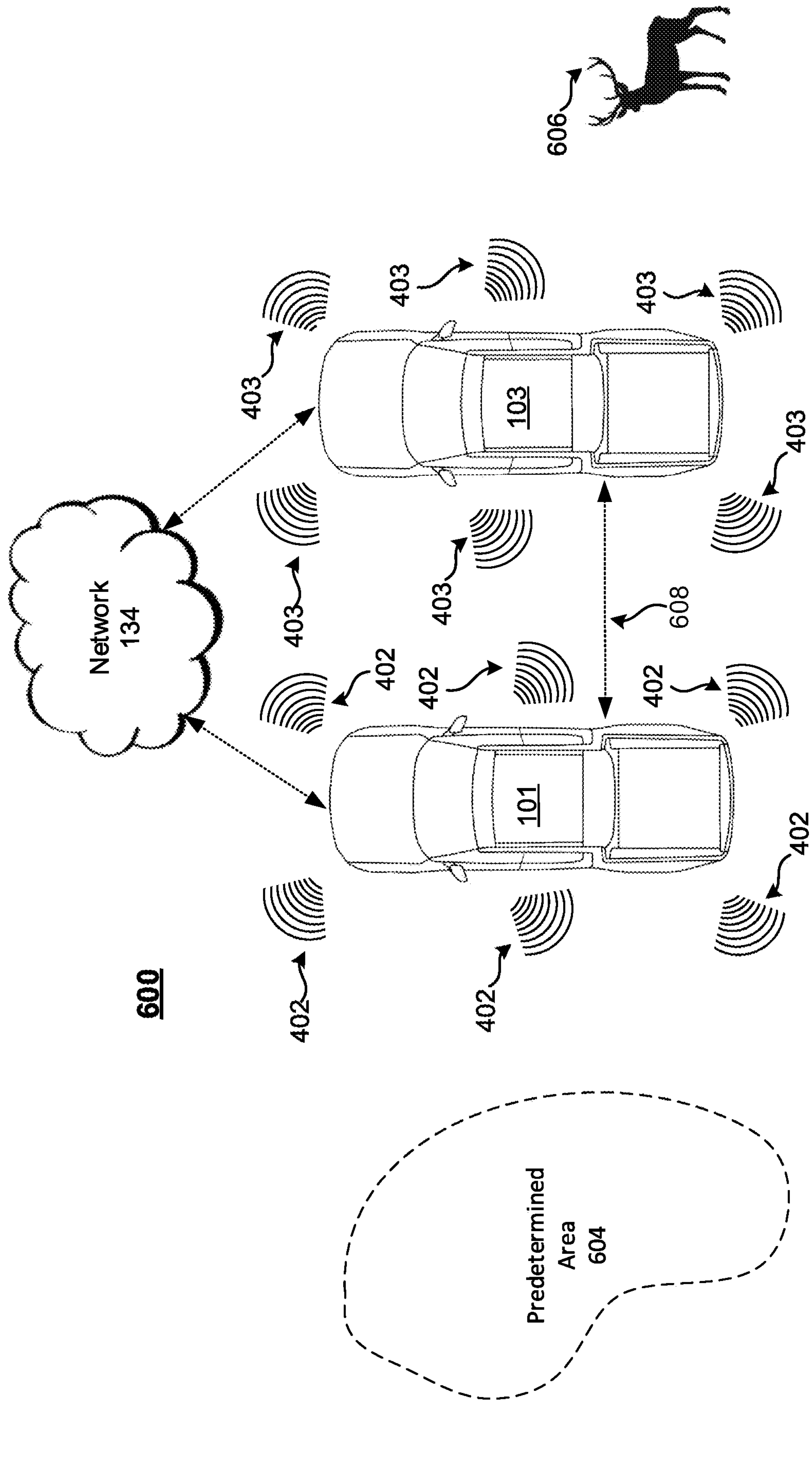
FIG. 6 shows an alternate aerial view of a scenario of two parked vehicles equipped with ADAS sensors to detect objects in or around a predetermined area and ability to communicate sensor data between the two vehicles, in accordance with some embodiments of the present disclosure.

FIG. 6 shows an alternate aerial view of a scenario 600 of two parked vehicles 101, 103 equipped with ADAS sensors 402, 403 to detect objects (e.g., object 606) in or around a predetermined area 604 and ability to communicate sensor data between the two vehicles 101 and 103, in accordance with some embodiments of the present disclosure. The predetermined area 604 is set by the user or determined by the processing circuitry 102 of the first vehicle 101. While the processing circuitry 102 uses ADAS sensors 402 to monitor the predetermined area 404, the ADAS sensors 402 are positioned all along the first vehicle 101 so that the sensors 402 are able to monitor all angles of the surrounding environment of the first vehicle 101. Although the predetermined area 604 may use a subset of sensors that directly monitor the predetermined area 604, other subsets of sensors are still used to detect an object 606 in the surrounding area of the first vehicle 101. However, in this scenario 600, a subset of the sensors 402 are blocked by the second vehicle 103, which is parked adjacent to the first vehicle 101. In some embodiments, the first vehicle 101 and the second vehicle 103 may be communicatively connected either through direct wireless connection 608 or by way of network 134. In some embodiments, the first vehicle 101 may be in communication with the second vehicle 103 to access sensor data from ADAS sensors 403 of the second vehicle 103. Therefore, first vehicle 101 uses sensor data from sensors 402 and sensor data from sensors 403 of the second vehicle 103 in order to monitor predetermined area 604 for an approaching object 606. In some embodiments, the second vehicle 103 may have another predetermined area set by the user of the second vehicle 103 or determined by the processing circuitry of the second vehicle 103. Accordingly, the second vehicle 103 may be able to monitor another predetermined area as well as send sensor data from sensors 403 that monitor the predetermined area 604 of the first vehicle 101. In some embodiments, the first vehicle 101 may send sensor data from sensors 402 that may be used by the processing circuitry of the second vehicle 103. In some embodiments, vehicle 101 and vehicle 103 may send notifications to each other in addition to sending notifications to their respective users. For example, vehicle 101 may send a notification of an approaching animal to vehicle 103, which may in turn send a notification to the user of vehicle 103.

When monitoring the predetermined area 604, if the object 606 is detected by sensors 403 on the second vehicle 103, a signal may be sent to the processing circuitry 102 of vehicle 101 via the communications circuitry 132. In some embodiments, the line of communication 608 between the first vehicle 101 and the second vehicle 103 provides added sensor support to detect the object 606, detect if the object 606 is approaching the predetermined area 604 or to determine whether the object 606 is an animal.

Figure 7:
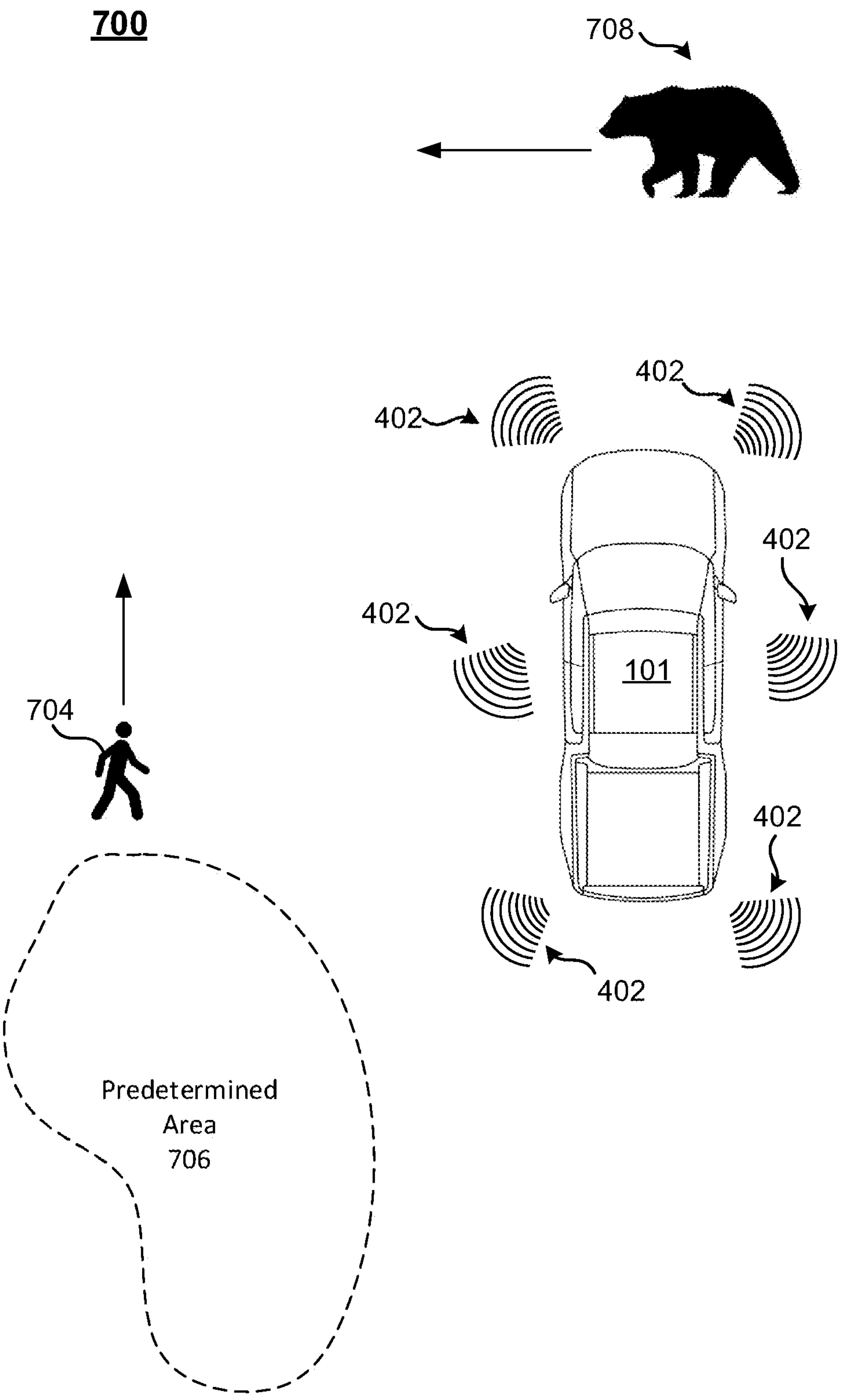
FIG. 7 shows an aerial view of a scenario of a parked vehicle equipped with ADAS sensors to detect objects in or around a location of a user, in accordance with some embodiments of the present disclosure.

FIG. 7 shows an aerial view of a scenario 700 of a parked vehicle 101 equipped with ADAS sensors 402 to detect objects (e.g., object 708) in or around a location of a user 704, in accordance with some embodiments of the present disclosure. In some embodiments, the user 704 may move outside of the predetermined area 706 that was selected by the user 704, as seen in FIG. 3. The processing circuitry 102 may determine that the user 704 moves outside of the predetermined area 706 by determining the location of the vehicle access key 136. In some embodiments, when the user 704 is moving, the processing circuitry 102 may also determine the direction of the movement. In some embodiments the processing circuitry 102 determines the location of the vehicle access key 136 by way of sending and receiving locating signals via the communications circuitry 132. The processing circuitry 102 may also determine the location and/or direction of movement of the object 708 based on sensor data from sensors 402. If the processing circuitry 102 determines that the movement trajectory of the user coincides with the direction of movement or current location of the object 708, the processing circuitry 102 may facilitate the activation of a vehicle deterrence feature and/or notify the user 704. In some embodiments, the processing circuitry 102 may simultaneously monitor the location and movement of user 704 as well as the predetermined area 706 for objects (e.g., object 708).

For example, if user 704 moves outside of the predetermined area 706, which is monitored by sensors 402 of vehicle 101, the sensors 402 may also monitor the area surrounding the user 704 and the area of the movement trajectory of the user 704. In some embodiments, object 708 may be detected by sensors 402 and processing circuitry 102 may determine that the movement trajectories of both the user 704 and the object 708 may intersect with each other. Therefore, the processing circuitry 102 may facilitate the activation of a vehicle deterrence feature for the object 708 from traveling along the current movement trajectory. As previously discussed, the vehicle deterrence feature may use the speaker 130 and/or lights 128 on the vehicle 101 to deter the object. In some embodiments, the processing circuitry 102 may notify the user 704 on a vehicle access key 136 to ensure that the user 704 does not encounter the object 708.

Figure 8:
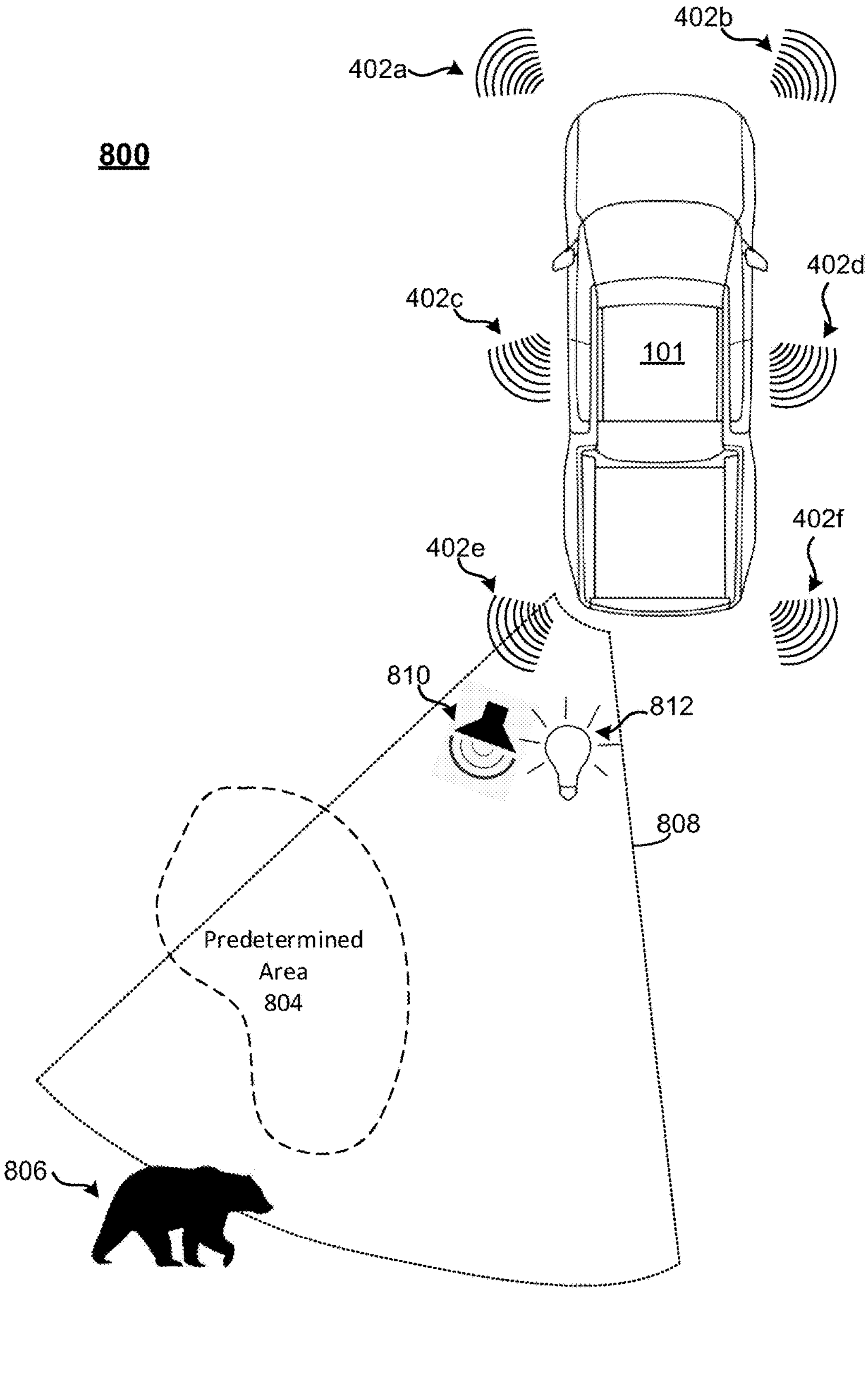
FIG. 8 shows an aerial view of a scenario of a parked vehicle equipped with ADAS sensors to detect objects in or around a predetermined area, where a vehicle deterrence feature is activated based on a detected object, in accordance with some embodiments of the present disclosure.

FIG. 8 shows an aerial view of a scenario 800 of a parked vehicle 101 equipped with ADAS sensors (e.g., 402*a*, 402*b*, 402*c*, 402*d*, 402*e*, 402*f*) to detect objects (e.g., object 806) in or around a predetermined area 804, where a vehicle deterrence feature 808 is activated based on a detected object 806, in accordance with some embodiments of the present disclosure. Similar to scenario 400 of FIG. 4, vehicle 101 is equipped with sensors 402 to detect objects in or around a predetermined area 804. Sensors 402 provide a monitoring view that spans around the whole vehicle 101. In some embodiments, sensors 402 comprise the ADAS sensors of vehicle 101. Each of the sensors 402 may have limitations on the distance that the sensor can capture an image or sense movements. Therefore, the predetermined area 804 selected by the user or determined by the processing circuitry 102 should be within the view of the sensors 402. As previously described, the sensors 402 are used to monitor the predetermined area 804 and the processing circuitry 102 can determine if an object such as object 806 is detected to approach predetermined area 804. Once the object 806 is detected and the processing circuitry 102 determines and classifies the object 806 as a type of animal, the processing circuitry 102 may activate a vehicle deterrence feature 808, which may comprise activating a speaker 810 (e.g., speaker 130) and/or activating a vehicle light 812 (e.g., vehicle light 128). In some embodiments, the processing circuitry 102 selects a speaker 130 and/or vehicle light 128 that, when activated, are directed toward the object 806.

For example, as seen in scenario 800, the object 806 may be detected by sensor 402*e* to be approaching predetermined area 804. The processing circuitry 102 may determine the type of animal of object 806, and then facilitate the activation of the vehicle deterrence feature 808 in the direction of the detected object 806. In this example, object 806 is classified, by the processing circuitry 102, as a black bear. High frequency sounds are useful to deter bears. Therefore, the processing circuitry 102 may access this information via its communications circuitry 132 from database 140. The information may be used by the processing circuitry to determine a frequency in which the speaker 130 sounds toward the black bear.

Figure 9:
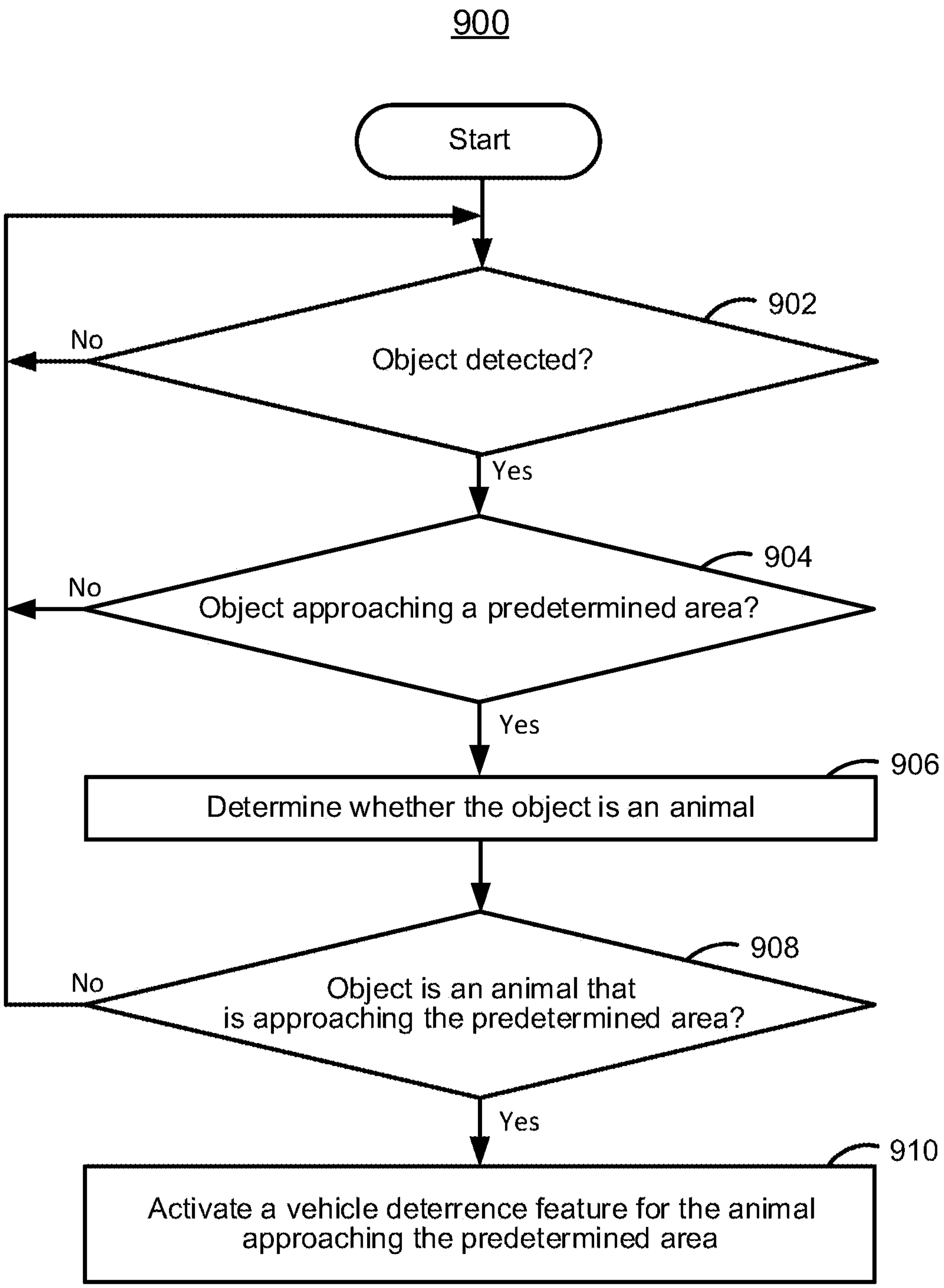
FIG. 9 shows a flowchart of an illustrative process to deter a detected animal from a predetermined area, in accordance with some embodiments of the present disclosure.

FIG. 9 shows a flowchart of an illustrative process 900 to deter a detected animal from a predetermined area, in accordance with some embodiments of the present disclosure. In some embodiments, process 900 is executed by processing circuitry 102 of the vehicle 101. In some embodiments, process 900 is executed by processing circuitry 102 as part of an animal deterrent system of vehicle 101.

At 902, the processing circuitry 102 determines whether an object has been detected. In some embodiments, an area (e.g., including a predetermined area) is monitored by the sensors on the vehicle 101, including one or more of thermal cameras 114, ultrasonic sensors 116, LIDAR sensors 118, radar sensors 120, and cameras 122. In some embodiments, sensor data is received from the one or more sensors via the sensor interface 112. In some embodiments, some of the sensor data is received from sensors of a nearby vehicle. In some embodiments, objects may be detected by the processing circuitry 102 based on the sensor data such as imaging captured by cameras, or changes in sensor data from distance sensors (e.g., LIDAR, radar, ultrasonic sensors, etc.). In some embodiments, the processing circuitry 102 polls the plurality of sensors for data in order to detect objects. In other embodiments, when sensors sense a change in sensor data or an image that indicates an object, the sensors send an interrupt signal to the processing circuitry 102. If the processing circuitry 102 determines that an object is detected, process 900 proceeds to 904 where the processing circuitry 102 determines whether the object is approaching a predetermined area. Otherwise, the processing circuitry 102 may continue to receive sensor data until the processing circuitry 102 detects an object.

At 904, the processing circuitry 102 determines whether the object approaching a predetermined area. The processing circuitry 102 may continue to receive sensor data and use the received data to determine whether the object is approaching the predetermined area, which is an area being monitored by the vehicle 101. In some embodiments, the processing circuitry 102 determines a straight-line distance between the predetermined area and the object, and the processing circuitry 102 determines that an object is approaching based on a distance threshold. When the processing circuitry 102 determines that the straight-line distance between the predetermined area and the object is less than the distance threshold, the object is determined to be approaching the predetermined area. In some embodiments, the processing circuitry 102 determines the path trajectory of the object, and the processing circuitry 102 determines that the object is approaching the predetermined area when an extended straight line of the path trajectory from the current location of the object intersects with the predetermined area or passes within a distance threshold of the predetermined area. If the processing circuitry 102 determines that the object is approaching the predetermined area at 904, the processing circuitry then determines whether the approaching object is an animal at 906. Otherwise, the processing circuitry 102 continues to determine whether the object is detected at 902 and whether the detected object is approaching the predetermined area at 904. For example, if the processing circuitry determines that an object is moving away from the predetermined area, the vehicle may continue to detect and track the object until the object is no longer in range of the plurality of sensors on the vehicle.

At 906, the processing circuitry 102 determines whether the object is an animal. The processing circuitry 102 receives sensor data from the plurality of sensors, including the thermal cameras 114 and cameras 122. Images and other sensor data may be used to determine whether the object is an animal and classify the animal. In some embodiments, the processing circuitry 102 may be use a neural network that is trained with sensor data (e.g., photos and videos) of animals to bolster the classification abilities of the network. Therefore, when real-time data (e.g., images of the object) are received, the neural network determines an animal classification based on the training. In some embodiments, the real-time sensor data and resulting classification may also be used to further train the neural network.

At 908, the processing circuitry 102 determines whether the object is an animal that is approaching the predetermined area. If the processing circuitry 102 determines that the object approaching the predetermined area is an animal, process 900 proceed to 910 where the processing circuitry 102 facilitates the activation of a vehicle deterrence feature for the animal from approaching the predetermined area. If the approaching object is not an animal, process 900 returns to 902 where the processing circuitry may continue monitoring for object detection. In some embodiments, the processing circuitry 102 may facilitate the activation of a different vehicle deterrence feature for certain identifiable objects, such as humans.

In some embodiments, processing circuitry 102 may concurrently execute multiple instances of process 900 when there are multiple objects detected in the surrounding environment of the vehicle and the predetermined area. In some embodiments, when the processing circuitry 102 determines that there is more than one object detected (e.g., at 902), the processing circuitry may use bounding boxes or labels for each object in order to differentiate between the objects in the sensor data (e.g., images or video). By tracking and labeling each object, the processing circuitry 102 may store data associated with the one or more objects and/or a classification of the detected objects.

At 910, the processing circuitry 102 facilitates the activation of a vehicle deterrence feature to deter the animal from approaching the predetermined area. The vehicle deterrence feature for the animal may include the use of speakers 130 and/or lights 128 on the vehicle 101. The processing circuitry 102 outputs signals to activate the vehicle lights 128 and speakers 130 through a vehicle deterrence feature interface 126 of the output circuitry 124, which is communicatively coupled to the processing circuitry 102. In some embodiments, the processing circuitry 102 determines a recommended vehicle deterrence feature that will best deter the determined and classified animal. In some embodiments, there is a default vehicle deterrence feature for any animal that the processing circuitry 102 cannot reliably classify. In some embodiments, processing circuitry 102 may activate multiple vehicle responses as the animal gets closer to the predetermined area. In some embodiments, the processing circuitry 102 activates a first vehicle response when the animal is a first distance away from the predetermined area. In some embodiments, the first vehicle response may include activating a subset of vehicle lights 128. In some embodiments, the processing circuitry activates a second vehicle response when the animal is a second distance, closer than the first distance, away from the predetermined area. In some embodiments, the second vehicle response may include activating a subset of vehicle lights 128 and activating speakers 130. Vehicle responses may make sounds of varying frequencies on the speakers 130 or varying light patterns on the vehicle lights 128. For example, a first vehicle response may include activating the low-beam vehicle lights, while a second vehicle response may include activating the high-beam vehicle lights. In some embodiments, the activated sounds, and light patterns of the second vehicle response are louder and more frequent than the first vehicle response in order to provide a more intense deterrence response to the animal. In some embodiments, the processing circuitry 102 selects a subset of vehicle lights 128 or speakers 130 to use for a vehicle response in order to direct the lights and sounds toward the animal. In another example, the first vehicle response may activate a subset of the vehicle lights 128 that will flash light toward the detected animal, while the second vehicle response may activate all vehicle lights 128 and flash the vehicle lights 128 at a higher pulse rate as the vehicle deterrence feature. However, the processing circuitry 102 may also use a neural network to determine a recommended vehicle deterrence feature that will deter the animal from approaching the predetermined area based on the animal classification data. In some embodiments, the processing circuitry 102 may use a neural network that is trained with animal classifications, vehicle deterrence features, and animal reactions to bolster the vehicle deterrence feature determination of the network. Therefore, when real-time data (e.g., animal classification data and animal actions) are received, the neural network determines a recommended vehicle deterrence feature based on the training. In some embodiments, the real-time sensor data and resulting vehicle deterrence feature and resulting animal actions may also be used to further train the neural network.

Figure 10:
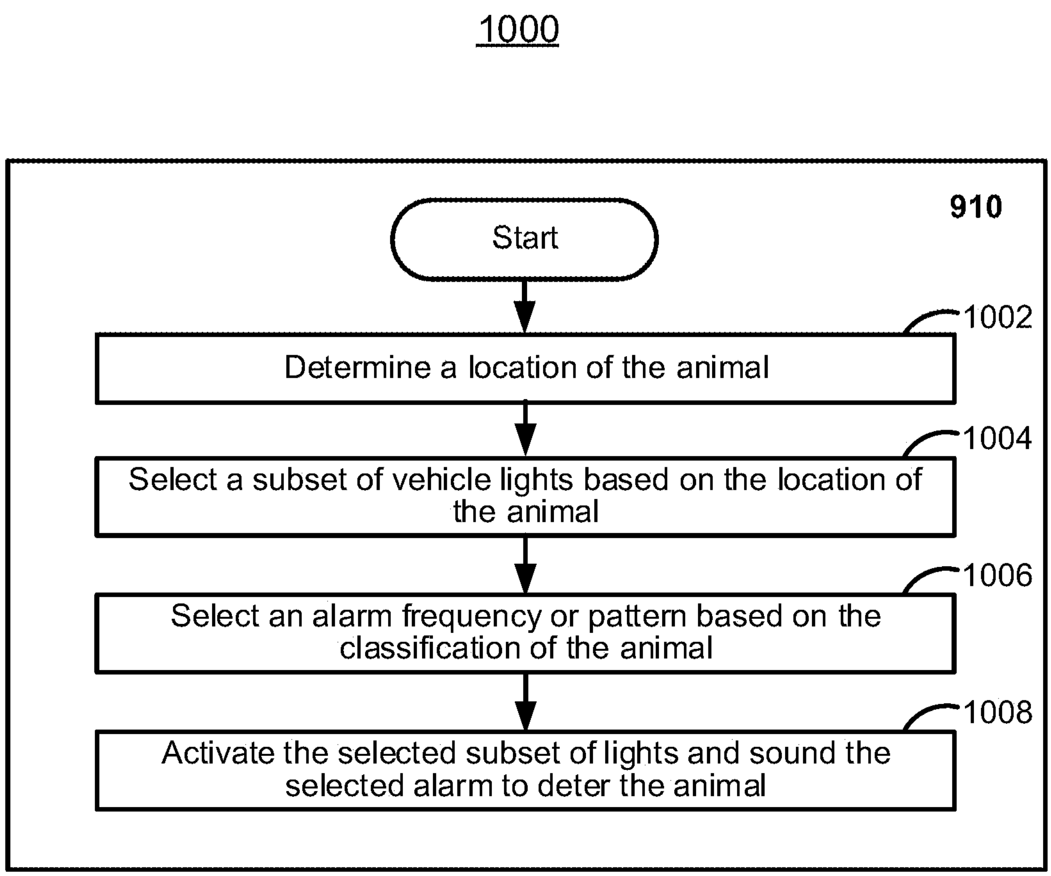
FIG. 10 shows a flowchart of an illustrative subprocess for activating a vehicle deterrence feature to deter an animal from approaching a predetermined area, in accordance with some embodiments of the present disclosure.

FIG. 10 shows a flowchart of an illustrative subprocess 1000 for activating a vehicle deterrence feature to deter an animal from approaching a predetermined area, in accordance with some embodiments of the present disclosure. In some embodiments, subprocess 1000 corresponds to step 910 of FIG. 9 and is executed by processing circuitry 102 of vehicle 101. In some embodiments, subprocess 1000 is executed by processing circuitry 102 as part of a process to deter a detected animal from a predetermined area. At 1002, processing circuitry 102 determines a location of the animal. For example, the processing circuitry 102 can receive sensor data from a plurality of sensors (e.g., thermal cameras 114, ultrasonic sensors 116, LIDAR sensors 118, radar sensors 120, and cameras 122) in order to determine the location of the animal. The location of the animal may be defined as a relative location of the animal from the vehicle 101 or a predetermined area.

At 1004, the processing circuitry 102 selects a subset of vehicle lights based on the location of the animal. Once the vehicle 101 determines the relative location of the animal, the processing circuitry selects a subset of vehicle lights 128 that direct light towards the current location of the animal. In some embodiments, the subset of vehicle lights includes one or more vehicle lights of a nearby vehicle. The selected vehicle lights 128 are chosen such that the animal may view the vehicles lights 128 when activated. In some embodiments, the processing circuitry 102 determines a light pattern with varying flashing times or orientations that best deters the classified animal. For example, in scenario 400 of FIG. 4, where animal 406 is located to the rear and to the left of vehicle 101, the processing circuitry 102 may determine a subset of vehicle lights that will direct light towards animal 406. For example, the subset of vehicle lights selected may include the left taillight of vehicle 101, which will direct light directly towards animal 406.

At 1006, processing circuitry 102 selects an alarm frequency or pattern based on the classification of the animal. The processing circuitry 102 determines sound frequencies and/or sound patterns that will deter the animal from approaching the predetermined area, based on the classification of the animal. The frequency of the alarm sounds is determined based on which sounds and frequencies the classified animal may be able to hear. For example, there may be certain frequencies and sound patterns that repels the animal.

At 1008, processing circuitry 102 activates the selected subset of lights and sounds the selected alarm to deter the animal. In some embodiments, the selected subset of lights and the alarm are activated on vehicle lights 128 and speakers 130 of vehicle 101 through the vehicle deterrence feature interface 126 of the output circuitry 124. The output circuitry 124 is communicatively coupled to the processing circuitry 102, which sends a signal to activate the vehicle deterrence feature to deter the animal.

Figure 11:
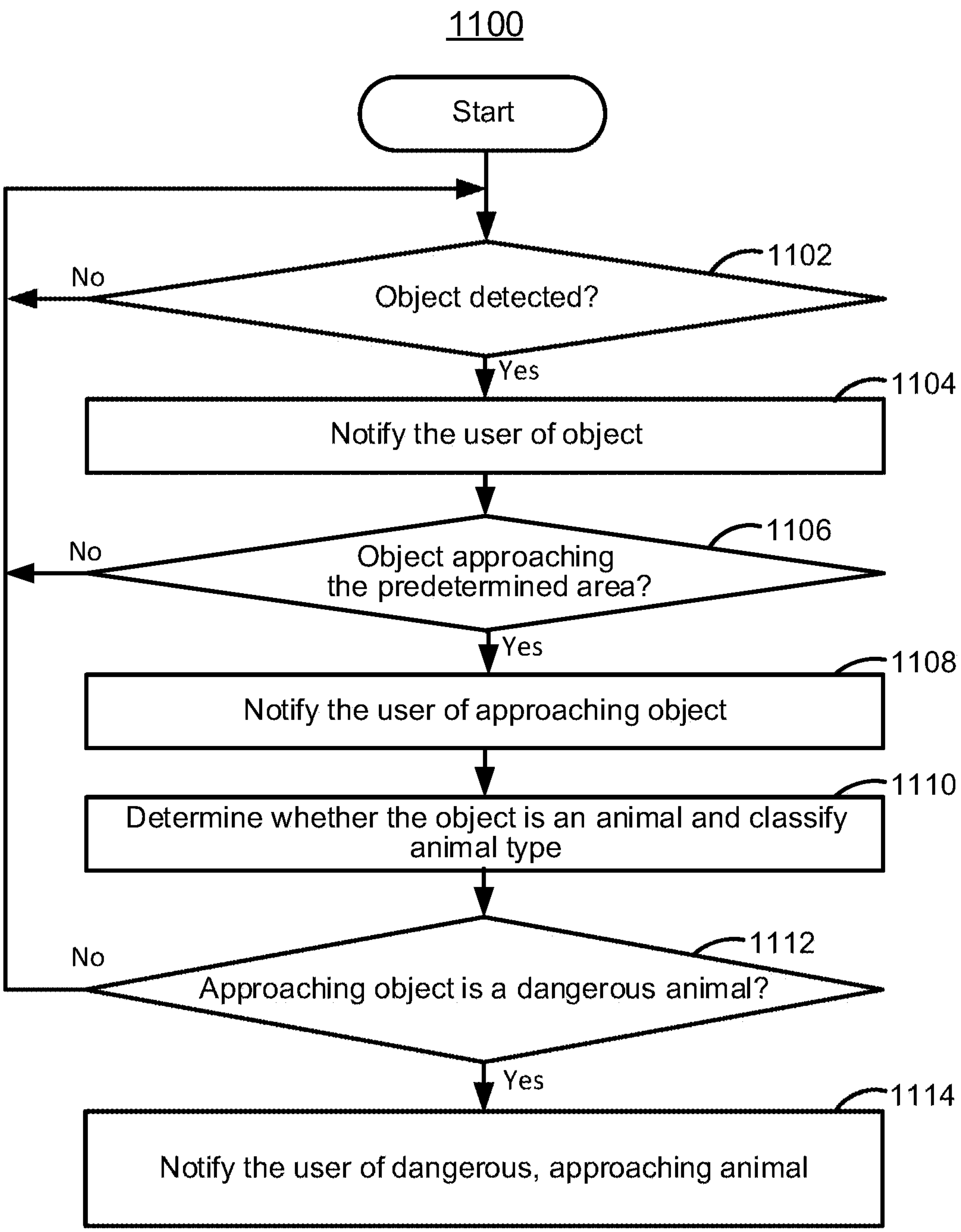
FIG. 11 shows a flowchart of an illustrative process for notifying a user of an approaching animal based on the movement of the animal and the location of the user, in accordance with some embodiments of the present disclosure.

FIG. 11 shows a flowchart of an illustrative process 1100 for notifying a user of an approaching animal based on movement of the animal and a location of the user, in accordance with some embodiments of the present disclosure. In some embodiments, process 1100 is executed by processing circuitry 102 of vehicle 101. The notifications sent to the user may vary depending on which notification level has been determined to be sent by the processing circuitry. In some embodiments, the notifications are sent by way of the communications circuitry 132, which is communicatively coupled to the processing circuitry 102. In some embodiments, the notifications are sent to the vehicle access key 136.

At 1102, the processing circuitry 102 determines whether an object is detected. In some embodiments, step 1102 corresponds to step 902 of FIG. 9. If the processing circuitry 102 determines that an object is detected based on sensor data, process 1100 proceeds to 1104 where the processing circuitry 102 notifies the user of the detected object. Otherwise, processing circuitry 102 may continue to monitor the surrounding area until an object is detected.

At 1104, processing circuitry 102 notifies the user of the object. In some embodiments, the processing circuitry 102 may send a first level notification to the user (e.g., a visual notification indicating an object is in the general area).

At 1106, processing circuitry 102 determines whether the object is approaching the predetermined area. In some embodiments, step 1106 corresponds to step 804 of FIG. 9. If the processing circuitry 102 determines that the object is approaching the predetermined area (e.g., based on sensor data and the location of the predetermined area), process 1100 proceeds to 1108 where the processing circuitry 102 notifies the user of the approaching object. Otherwise, the processing circuitry 102 may continue to receive sensor data and use the received data to determine whether the object is approaching the predetermined area. In some embodiments, the processing circuitry 102 may determine that the object is approaching a user that is located outside of the predetermined area based on the location of the object as well as the location of a vehicle access key 136.

At 1108, the processing circuitry 102 notifies the user of the approaching object. In some embodiments, the processing circuitry 102 may send a second level notification to the user.

At 1110, processing circuitry 102 determines whether the object is an animal and classify the animal type. The processing circuitry 102 determines whether the object is an animal based on sensor data such an images or video as described above. In some embodiments, the animal is also classified under an animal type or category.

At 1112, processing circuitry 102 determines whether the approaching object is a dangerous animal. If the processing circuitry 102 determines that the approaching object is an animal type that is considered dangerous, process 1100 proceeds to 1114 where the processing circuitry 102 notifies the user of the dangerous, approaching animal. Otherwise, the processing circuitry 102 determines that the approaching object is not a dangerous animal and may continue to monitor and detect objects at 1102.

At 1114, the processing circuitry 102 notifies the user of the dangerous, approaching animal. When the processing circuitry 102 determines that the object approaching the predetermined area is a dangerous animal the processing circuitry 102 may notify the user of the dangerous animal approaching the predetermined area with a level three notification.

Each notification level varies in the notification urgency and how the notification is presented to the user. For example, a higher-level notification may send a notification with an audible alert and tactile feedback on the user device, while a lower-level notification may send a visual notification to the user device with less urgency.

Figure 12:
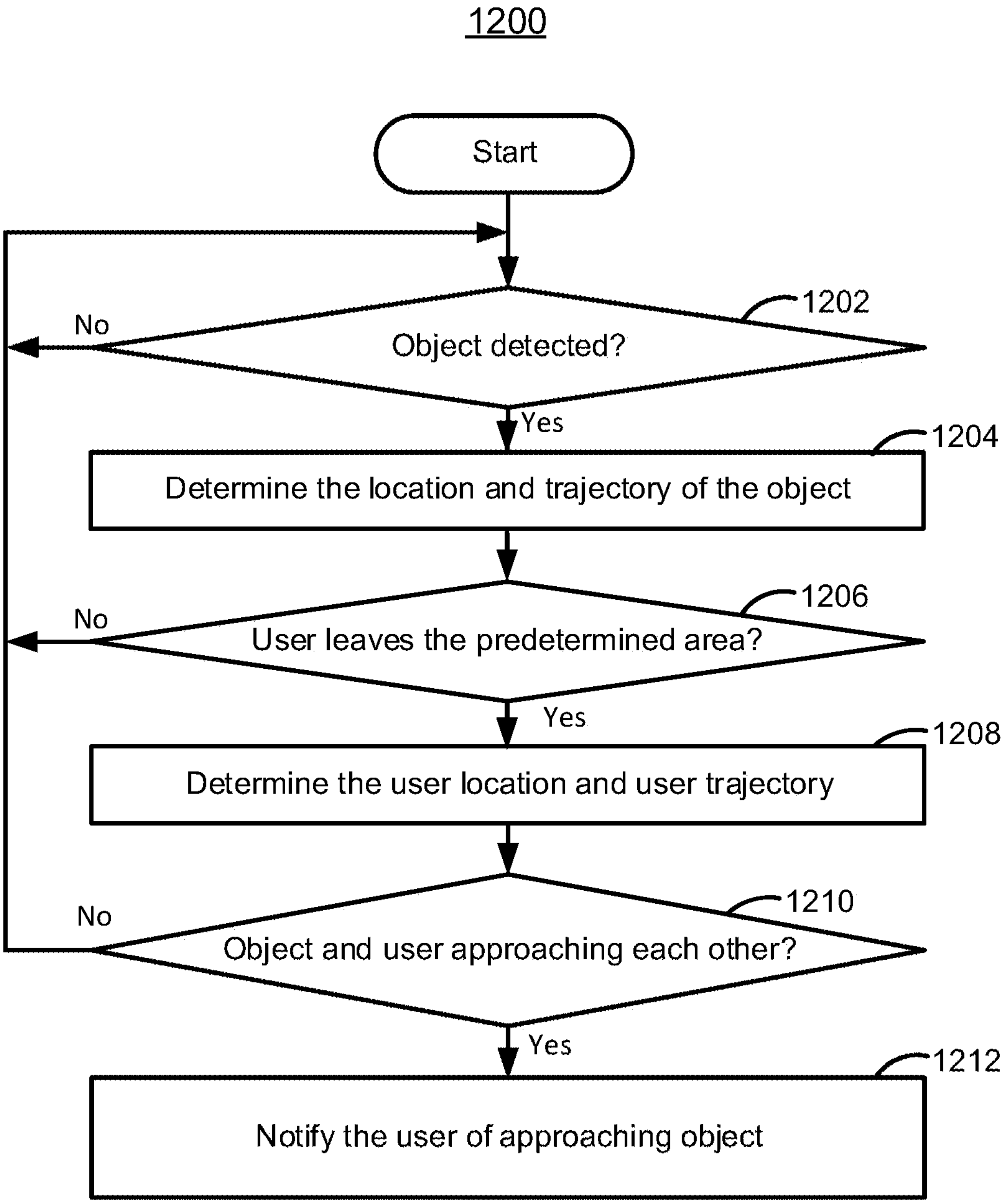
FIG. 12 shows a flowchart of an illustrative process for notifying a user of an approaching object based on the locations and movements of the user and animal, in accordance with some embodiments of the present disclosure.

FIG. 12 shows a flowchart of an illustrative process 1200 for notifying a user of an approaching object based on the locations and movements of the user and animal, in accordance with some embodiments of the present disclosure. In some embodiments, process 1200 is executed by processing circuitry 102 of the vehicle 101. In some embodiments, process 1200 is used to notify a user leaving the predetermined area of an approaching animal based on the locations and movement of each of the user and the animal.

At 1202, the processing circuitry 102 determines whether an object has been detected. In some embodiments, step 1202 corresponds to step 902 of FIG. 9. If the sensor data from the plurality of sensors (e.g., thermal cameras 114, ultrasonic sensors 116, LIDAR sensors 118, radar sensors 120, or cameras 122) indicates that an object is detected, process 1200 proceeds to 1204 where the processing circuitry 102 determines the location and trajectory of the object. When no object is detected, processing circuitry 102 will continue to monitor the surrounding environment until an object is detected at 1202.

At 1204, the processing circuitry 102 determines the location and trajectory of the object. In some embodiments, the object may be moving toward the predetermined area. In other embodiments, the object may be moving away from the predetermined area. However, in either case, the processing circuitry 102 determines the current location and the path trajectory that the object is traveling along.

At 1206, the processing circuitry 102 determines whether the user leaves the predetermined area. In some embodiments, the user is inside the predetermined area that has been selected by the user or determined by the processing circuitry 102, for the sensors of the vehicle 101 to monitor. However, when the user leaves the predetermined area, the processing circuitry 102 may use the location of the vehicle access key 136 to determine whether the user is in the predetermined area. In some embodiments, the sensors of vehicle 101 are used to determine whether the user is in the predetermined area. When the processing circuitry 102 determines that the user moves outside of the predetermined area, process 1200 proceeds to 1208 where the processing circuitry 102 determines the user location and the path trajectory for the user. Otherwise, the processing circuitry 102 determines that the user is located within the predetermined area and the processing circuitry 102 may continue to monitor the area for object detection at 1202.

At 1208, the processing circuitry 102 determines the user location and trajectory. While the user is outside of the predetermined area, the location of the user may become a priority for the sensors to monitor for objects (e.g., animals). In some embodiments, the user is moving along a path trajectory and the processing circuitry 102 may determine a direction and speed that the user is moving. The determined path trajectory will aid the processing circuitry 102 in determining an area to monitor before the user reaches that area. Additionally, the processing circuitry 102 may determine that the path trajectory for the user may intersect with the path trajectory of an object, at 1210.

At 1210, the processing circuitry 102 determines whether the object and the user are approaching each other. When the processing circuitry 102 determines that the path trajectory of the user intersects with the path trajectory of the object, the processing circuitry 102 may notify the user of the approaching object at 1212. Otherwise, if the object and the user are not moving toward each other, the system 100 of the vehicle 101 will continue to monitor for objects (e.g., using ADAS sensors) at 1202.

At 1212, the processing circuitry 102 notifies the user of the approaching object. When the processing circuitry 102 determines that the object is approaching the user or that the user is approaching the object, the processing circuitry 102 may notify the user of the approaching object (e.g., of an animal or a dangerous animal). In some embodiments, the notification is sent to the vehicle access key 136 by way of the communications circuitry 132. The notification may have a visual notification with a haptic feedback in order for the user to detect a notification on the vehicle access key 136.

Figure 13:
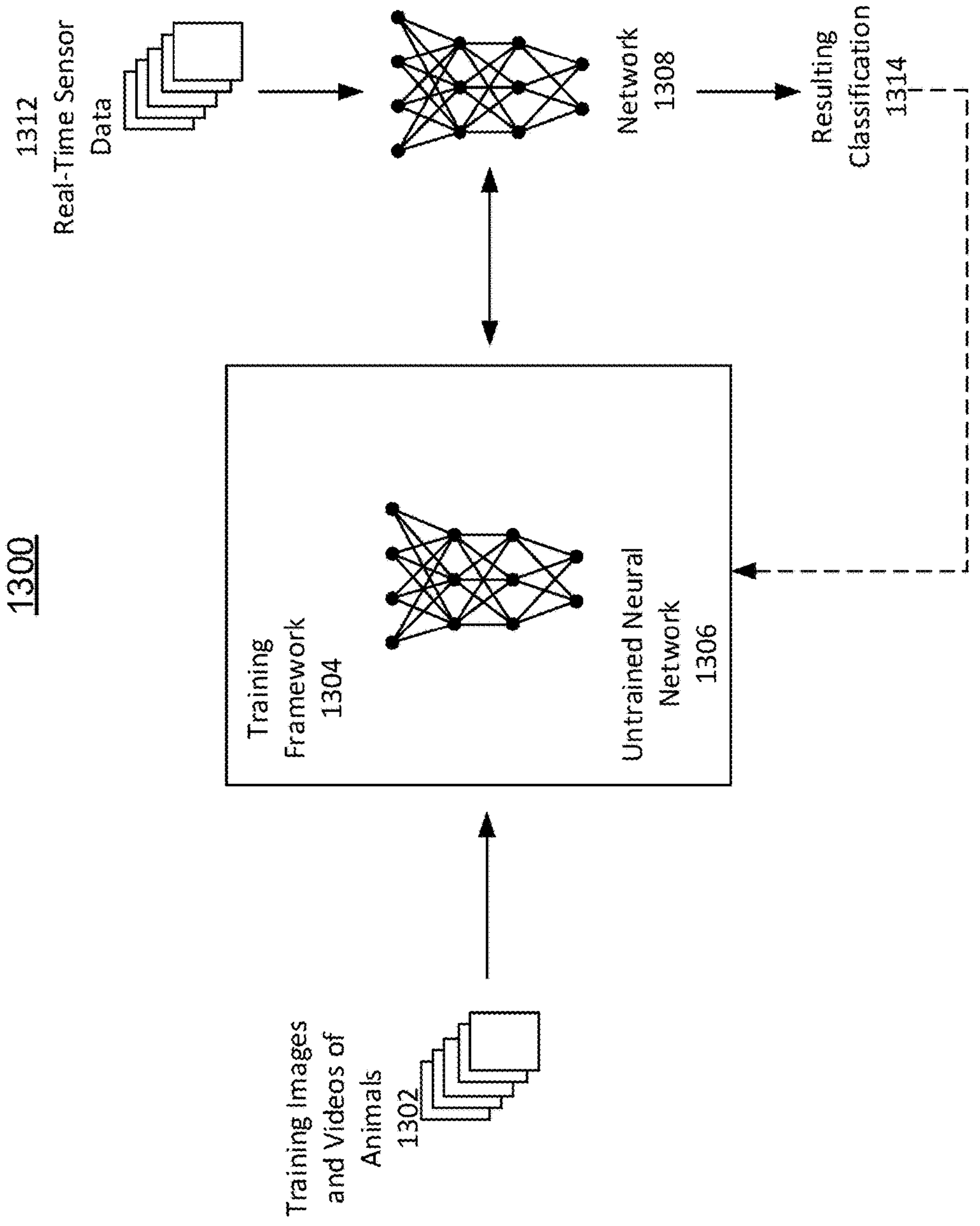
FIG. 13 shows an illustrative machine learning model for detecting an animal in an image and classifying the type of animal, in accordance with some embodiments of the present disclosure.

FIG. 13 shows an illustrative machine learning model 1300 for detecting an animal in an image and classifying the type of animal, in accordance with some embodiments of the present disclosure. Machine learning model 1300 may be, e.g., a convolutional neural network (CNN), or any other suitable machine learning model trained to accept as input real-time sensor data 1312 (e.g., an image) for a surrounding environment of vehicle 101 and output a resulting classification 1314 of a type of animal depicted by the real-time data 1312. Training data may comprise images and videos of animals 1302 and having been assigned classification labels for each training data. In some embodiments, the resulting classification 1314 and associated real-time sensor data 1312 may be used as training data for the untrained machine learning model 1306. For example, each training image or video of an animal 1302 may be associated with a vector of any suitable number of dimensions encoding information specifying whether one or more objects are present in the training image, and if so, specifying a type of the animal and specifying parameters (e.g., x-coordinate, y-coordinate, midpoint, height, width) of a bounding box surrounding a perimeter of the animal, and/or indicating a distance from vehicle to animal annotation.

Training framework 1304 may train the untrained machine learning model 1306 using processing resources described herein, to generate a trained machine learning model 1308. In some embodiments, initial weights may be chosen randomly or by pre-training using a deep belief network. Training may be performed in either a supervised, partially supervised, or unsupervised manner.

Machine learning model 1308 may be trained to output a probability of whether inputted real-time sensor data 1312 (e.g., an inputted image) contains an animal and a prediction of one or more parameters (e.g., animal type) of a bounding box surrounding the object. In some embodiments, animal predictions associated with a probability below a certain threshold (e.g., 0.4) may be discarded. In some embodiments, inputted real-time data 1312 (e.g., an image) may be divided into cells or regions according to a grid (e.g., forming an array of regions that in aggregate constitute the image), and analysis may be performed on each region of the image to output a prediction of whether an animal is present and predicted bounding box coordinates within a particular region. For example, a filter or kernel of any suitable size (e.g., 3×3 pixels) may be overlaid on each region of the image, to perform a convolution, e.g., multiplying together each overlapping pixel, and adding each product together, and inputted to the machine learning model in outputting predictions.

In some embodiments, (e.g., such as if a regression classifier is used) untrained machine learning model 1306 may be trained using supervised learning, wherein training images and videos 1302 includes an input paired with a desired output, or where training images and videos 1302 includes input having known output and outputs of neural networks are manually graded. In some embodiments, untrained machine learning model 1306 may be trained in a supervised manner. Training framework 1304 may process inputs from training images and videos 1302 and compare resulting outputs against a set of expected or desired outputs. In some embodiments, errors may then be propagated back through untrained machine learning model 1306. Training framework 1304 may adjust weights that control untrained machine learning model 1306. Training framework 1304 may include tools to monitor how well untrained machine learning model 1306 is converging towards a model, such as trained machine learning model 1308, suitable for generating correct answers, such as in resulting classification 1314, based on known input data, such as new real-time sensor data 1312. In some embodiments, training framework 1304 trains untrained neural network 1306 repeatedly while adjusting weights to refine an output of untrained neural network 1306 using a loss function and adjustment process, such as stochastic gradient descent. In some embodiments, training framework 1304 trains untrained machine learning model 1306 until untrained neural network 1306 achieves a desired accuracy. Trained machine learning model 1308 can then be deployed to implement any number of machine learning operations.

In some embodiments, untrained machine learning model 1306 may be trained using unsupervised learning, wherein untrained machine learning model 1306 attempts to train itself using unlabeled data. In some embodiments, unsupervised learning training images and video 1302 may include input data without any associated output data or "animal truth" data. Untrained machine learning model 1306 can learn groupings within training images and videos 1302 and can determine how individual inputs are related to untrained images and videos 1302. In some embodiments, unsupervised training can be used to generate a self-organizing map, which is a type of trained machine learning model 1308 capable of performing operations useful in reducing dimensionality of new real-time sensor data 1312. Unsupervised training can also be used to perform anomaly detection, which allows identification of data points in new real-time sensor data 1312 that deviate from normal or existing patterns of new real-time sensor data 1312. In some embodiments, semi-supervised learning may be used, which is a technique in which training images and videos 1302 includes a mix of labeled and unlabeled data. Training framework 1304 may thus be used to perform incremental learning, such as through transferred learning techniques. Such incremental learning may enable trained machine learning model 1308 to adapt to new real-time sensor data 1312 without forgetting knowledge instilled within the network during initial training.

It will be understood that trained machine learning model 1308 may both detect an object and determine whether the object is an animal. For example, trained machine learning model 1308, based on real-time sensor data 1312, may output an indication that an animal is detected or that a type of animal is detected. Accordingly, in some embodiments, trained machine learning model 1308 may be used to perform steps 902 and 906 of FIG. 9 and steps 1102 and 1110 of FIG. 11.

Figure 14:
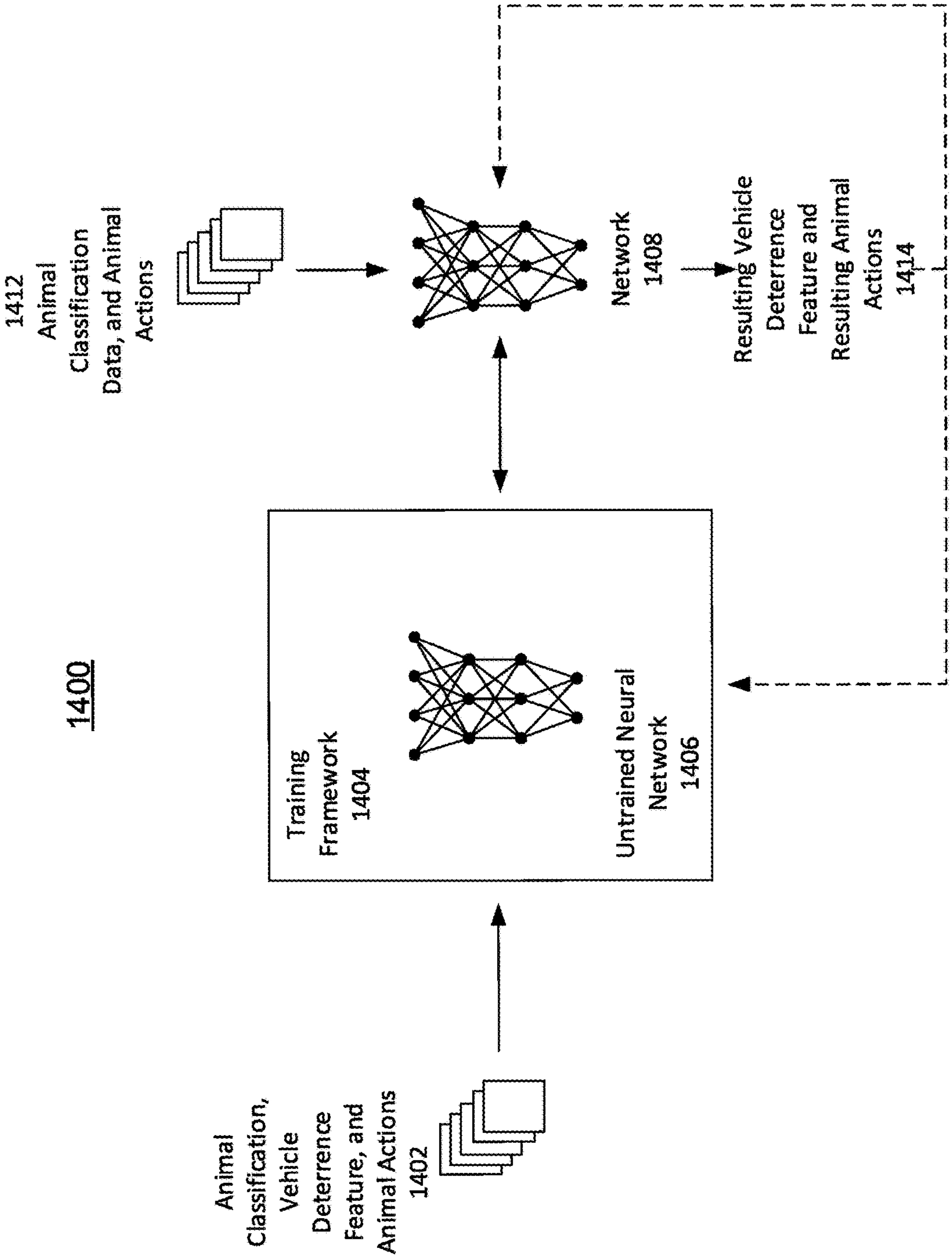
FIG. 14 shows an illustrative machine learning model for selecting and facilitating activation of a vehicle deterrence feature for the classified animal in an image, in accordance with some embodiments of the present disclosure

FIG. 14 shows an illustrative machine learning model 1400 for selecting and facilitating activation of a vehicle deterrence feature 1414 to deter the classified animal in an image, in accordance with some embodiments of the present disclosure. Machine learning model 1400 may be, e.g., a convolutional neural network (CNN), or any other suitable machine learning model trained to accept as input a data set (e.g., animal classification data and animal actions 1412) for an animal detected in a surrounding environment of vehicle 101 and output a resulting vehicle deterrence feature and resulting animal actions 1414 for a type of animal classified. Training data may comprise animal classifications 1402 and corresponding vehicle deterrence feature for each training data. In some embodiments, the resulting vehicle deterrence feature 1414 and associated animal classification data and animal actions 1412 may be used as training data for the untrained machine learning model 1406. Training framework 1404 may train the untrained machine learning model 1406 using processing resources described herein, to generate a trained machine learning model 1408. In some embodiments, initial weights may be chosen randomly or by pre-training using a deep belief network.

In some embodiments, the resulting vehicle deterrence feature 1414 may activate, but the animal may not be deterred by the resulting vehicle deterrence feature 1414. Therefore, the resulting animal actions due to the vehicle deterrence feature 1414 may be looped back into the network in order to determine a second vehicle deterrence feature based on the animal classification data and animal actions 1412. In addition, the resulting vehicle deterrence feature and resulting animal actions 1414 may be used to train the untrained neural network 1406.

For example, if a raccoon or other non-dangerous animal is determined to be approaching the predetermined area, the machine learning model 1408 may be trained to select a short, vehicle light-based resulting vehicle deterrence feature 1414. A second example, wherein a bear, or another dangerous animal is determined to be approaching the predetermined area, the machine learning model 1408 may be trained to activate a resulting vehicle deterrence feature 1414 that includes activating all vehicle lights 128 and also sound a high frequency sound on a speaker 130. Each of the resulting vehicle deterrence features 1414 are determined by the machine learning model 1408 based on animal classification, vehicle deterrence features, and animal actions 1402 for the type of animal of the detected object.

Machine learning model 1408 may be trained to output a probability of whether inputted animal classification and animal actions 1412 contains an animal type and a prediction of one or more parameters (e.g., alarm sound frequency, vehicle light patterns) of a resulting vehicle deterrence feature 1414. In some embodiments, vehicle deterrence feature predictions associated with a probability below a certain threshold (e.g., 0.4) may be discarded. In some embodiments, machine learning model 1408 may be used to determine a vehicle deterrence feature at step 910 of FIG. 9 and at step 1006 of FIG. 10.

Figure 15:
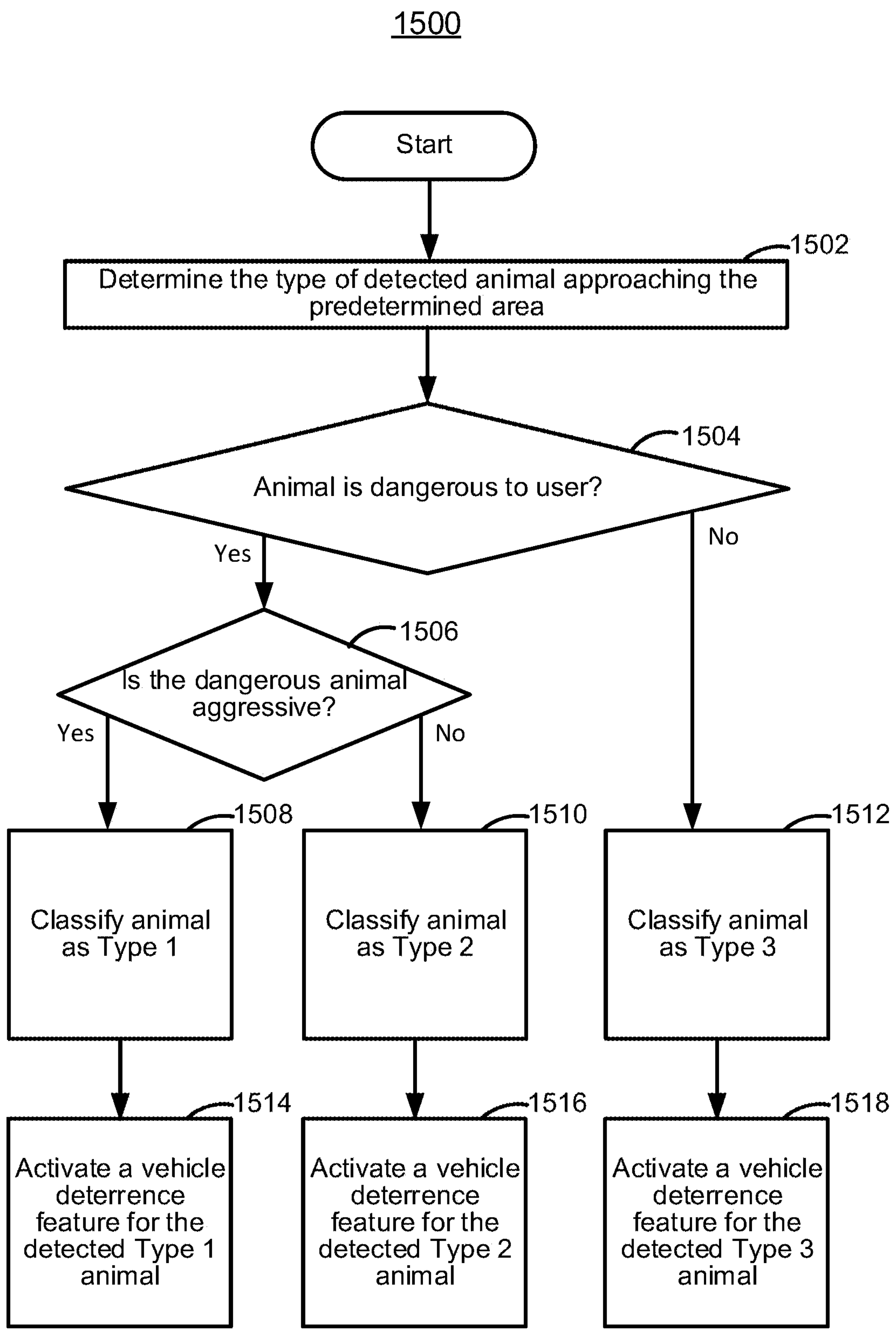
FIG. 15 shows a flowchart of an illustrative process for classifying a type of animal for a detected animal, in accordance with some embodiments of the present disclosure.

FIG. 15 shows a flowchart of an illustrative process 1500 for classifying a type of animal for a detected animal, in accordance with some embodiments of the present disclosure. In some embodiments, process 1500 is executed by processing circuitry 102 of the vehicle 101. In some embodiments, process 1500 may be used as a subprocess of activating a vehicle deterrence feature for the animal approaching a predetermined area (e.g., at 910 of process 900).

At 1502, the processing circuitry 102 determines the type of detected animal approaching the predetermined area. The processing circuitry 102 may classify the type of detected animal by using a machine learning model (e.g., machine learning model 1308). In some embodiments, the processing circuitry 102 uses sensor data (e.g., real-time sensor data 1312), to determine the type of animal. Each type of animal has characteristic data associated with the type of animal that includes behavioral data, geographical data, and physical data. In some embodiments, the characteristic data of the animal may be used to classify the animal.

At 1504, the processing circuitry 102 determines whether the animal is dangerous to the user. If the processing circuitry 102 determines that the determined type of animal is dangerous to the user, the processing circuitry 102 then determines whether the dangerous animal is aggressive at 1506. If the processing circuitry 102 determines that the animal is not dangerous to the user, the processing circuitry 102 classifies the animal as a type 3 animal at 1512. For example, if the detected animal is a deer, the processing circuitry 102 may determine that a deer is not a dangerous animal to the user, and therefore classify the deer as a type 3 animal at 1512. Once the processing circuitry 102 classifies the animal as a type 3 animal, the processing circuitry 102 facilitates the activation of a vehicle deterrence feature at 1518.

At 1506, the processing circuitry 102 determines whether the dangerous animal is aggressive. If the processing circuitry 102 determines that the dangerous animal is aggressive, the processing circuitry 102 then classifies the animal as a type 1 animal at 1508. If the processing circuitry 102 determines that the dangerous animal is not aggressive, the processing circuitry 102 then classifies the animal as a type 2 animal at 1510. For example, if the detected animal is a raccoon, which may be considered a dangerous animal, however it may not initiate an encounter with the user. In this example, the processing circuitry may classify a raccoon as a type 2 animal at 1510.

At 1508, the processing circuitry 102 classifies the animal as a type 1 animal, which may be a dangerous animal that is aggressive and may initiate a harmful encounter with a user or the predetermined area. Once the processing circuitry 102 classifies the animal as a type 1 animal, the processing circuitry 102 facilitates the activation of a vehicle deterrence feature at 1514.

At 1510, the processing circuitry 102 classifies the animal as a type 2 animal, which may be a dangerous animal that may not initiate a harmful encounter with a user or predetermined area. When the processing circuitry 102 classifies the animal as a type 2 animal, the processing circuitry 102 facilitates the activation of a vehicle deterrence feature at 1516.

At 1514, the processing circuitry 102 facilitates the activation of a vehicle deterrence feature for the detected type 1 animal. The vehicle deterrence feature deployed for a type 1 animal may include sounding an audio alert from a speaker 130 and/or flashing vehicle lights 128. In some embodiments, the flashing vehicle lights 128 may include flashing of high-beam lights.

At 1516, the processing circuitry 102 facilitates the activation of a vehicle deterrence feature for the detected type 2 animal. The vehicle deterrence feature deployed for a type 2 animal may include an audio alert from speaker 130 and/or flashing vehicle lights 128. In some embodiments, the audio alert of a vehicle deterrence feature for a type 2 animal has a smaller amplitude than the audio alert of a vehicle deterrence feature for a type 1 animal. In some embodiments, the flashing vehicle lights 128 of a vehicle deterrence feature for a type 2 animal occurs less frequently than the vehicle deterrence feature for a type 1 animal and may use low-beam lights.

At 1518, the processing circuitry 102 facilitates the activation of a vehicle deterrence feature for the detected type 3 animal. In some embodiments the vehicle deterrence feature for a detected type 3 animal includes flashing vehicle lights 128. In some embodiments, the flashing vehicle lights of the vehicle deterrence feature for a type 3 animal includes flashing low-beam vehicle lights. For example, the vehicle deterrence feature for a deer (a type 3 animal) may not use audio alerts to deter the deer from approaching the predetermined area. In some embodiments, processing circuitry 102 may determine to not activate any vehicle deterrence features for a detected type 3 animal. In some embodiments, a vehicle deterrence response is not needed for a non-dangerous, non-aggressive animal. The processing circuitry 102 may determine to not activate a vehicle deterrence response on the detected type 3 animal based on observed data from prior encounters or shared public data from any of multiple other vehicles. In some embodiments, the detected type 3 animal may be an animal that the user has indicated interest in interacting with (e.g., based on the user's preference setting stored in database 140, via a mobile application or animal search results), and therefore the processing circuitry 102 may not activate a vehicle deterrence feature. In some embodiments, the processing circuitry 102 may notify the user, via communications circuitry 132 to a vehicle access key 136 (e.g., a user device or vehicle key fob), of the detected type 3 animal. The user may select an option presented on the vehicle access key 136 to indicate whether the user prefers for a vehicle deterrence feature to activate for the detected type 3 animal or for no vehicle deterrence feature to be activated. In some embodiments, this preference selection is stored in database 140.

Figure 16:
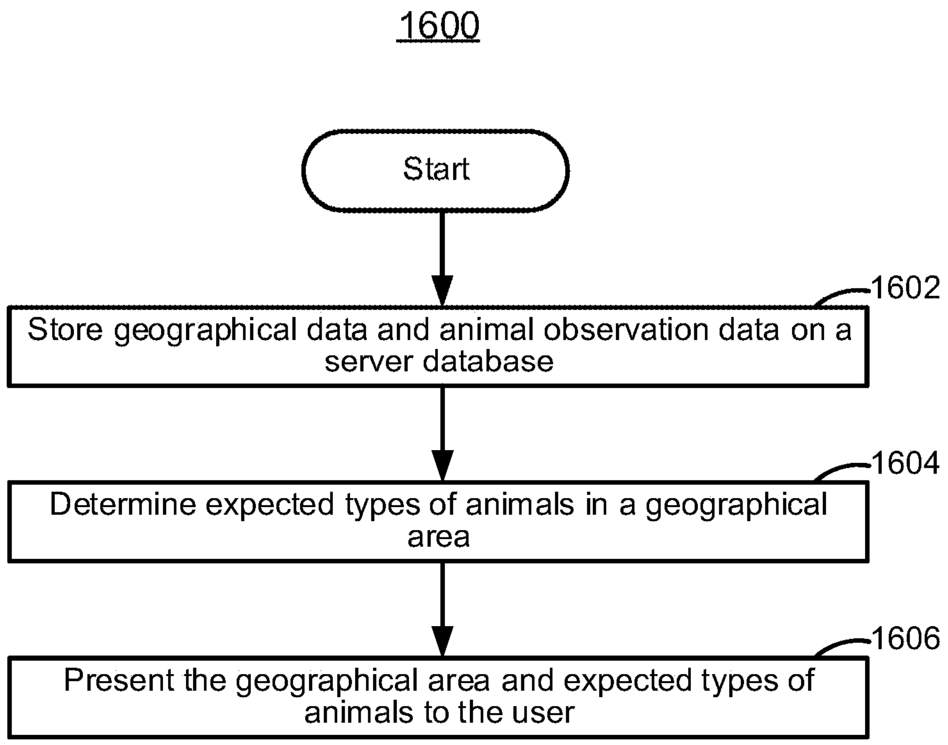
FIG. 16 shows a flowchart of an illustrative process for accumulating geographical data and animal observation data and presenting the data to the user, in accordance with some embodiments of the present disclosure.

FIG. 16 shows a flowchart of an illustrative process 1600 for accumulating geographical data and animal observation data and presenting the data to the user, in accordance with some embodiments of the present disclosure.

At 1602, the processing circuitry 102 stores geographical data and animal observation data on a server database 140. In some embodiments, the geographical data and animal observation data may be received from multiple vehicle across a wide range of geographical locations. For example, the processing circuitry 102 of a vehicle 101 may transmit geographical data of the vehicle determined by the global positioning system (GPS) 135 and corresponding animal observation data to server database 140 via the communications circuitry 132. The animal observation data may include animal classifications determined by the processing circuitry 102. In some embodiments, the animal observation data may initially be stored in memory 106. In some embodiments, the animal observation data may also be stored in database 140 with the associated geographical data. In some embodiments, the database 140 and stored data is accessible to the processing circuitry 102 of the vehicle 101 in order to retrieve expected types of animals associated with a geographical area (e.g., observed by other vehicles). In some embodiments, the database 140 may be accessible by any of multiple other vehicles, such that each processing circuitry of each other vehicle may retrieve expected types of animals associated with a geographical area. In some embodiments, the animal observation data and associated geographical area data from multiple vehicles may accumulate within an accessible database.

At 1604, the processing circuitry 102 determines expected types of animals in a geographical area. In some embodiments, the processing circuitry 102 may determine the expected types of animals by determining the current geographical location or a searched geographical location and using the determined current location or searched location to access the associated animal observation data from a database 140, memory 106, or both.

At 1606, the processing circuitry 102 presents the geographical area and expected types of animals to the user. In some embodiments, the geographical area and expected types of animals may be displayed to the user on a display, such as one or more of driver display 202 and/or center display 206 in FIG. 2. As another example, the geographical area and expected types of animals may be displayed on user device 138. In some embodiments, steps 1604 and 1606 may be performed to determine expected geographical areas where types of animals can be found. For example, at 1604, a user may search for geographical areas where rabbits can be found, and search results may be presented at step 1606. This functionality can be used to enable a user to plan a camping trip to view desired types of animals.

It will be understood that the illustrative steps of processes 900, 1000, 1100, 1200, 1500, and 1600 may be combined, omitted, or otherwise modified, in accordance with the present disclosure.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system, comprising:
a plurality of sensors on a vehicle configured to detect a presence of an object; and
processing circuitry configured to:
generate a navigational view based on a global positioning system (GPS) location of the vehicle;
receive a user input selecting a predetermined area from the navigational view wherein the predetermined area does not surround the vehicle;
receive, from a second vehicle, over a network connection, an indication that a type of animal is approaching the predetermined area; and
in response to determining that the type of animal is dangerous:
select a recommended vehicle deterrence feature of a plurality of vehicle deterrence features based on the type of animal; and
facilitate activation of the recommended vehicle deterrence feature.

2. The system of claim 1, wherein the plurality of sensors of the vehicle comprises one or more of a RADAR sensor, a LIDAR sensor, an ultrasonic sensor, a camera, or a thermal camera.

3. The system of claim 1, wherein the processing circuitry is configured to set the predetermined area based on a location of a vehicle access key associated with the user.

4. The system of claim 1, further comprising:
a plurality of vehicle lights; and
a speaker, wherein:
the recommended vehicle deterrence feature comprises turning on one or more of the plurality of vehicle lights or causing the speaker to make a sound audible to the animal.

5. The system of claim 1, wherein the processing circuitry is further configured to:
select a subset of available vehicle lights to turn on as the recommended vehicle deterrence feature based on a location of the animal.

6. The system of claim 1, wherein the recommended vehicle deterrence feature comprises a first vehicle response and a second vehicle response, wherein the processing circuitry is further configured to:
activate the first vehicle response when the animal is a first distance away from the predetermined area, wherein the first vehicle response includes activation of vehicle lights or an audible sound from the vehicle; and
activate the second vehicle response when the animal is a second distance, closer than the first distance, away from the predetermined area, wherein the second vehicle response includes activation of vehicle lights and an audible sound from the vehicle.

7. The system of claim 1, wherein the processing circuitry is further configured to:
select a subset of the plurality of sensors based on a location of the predetermined area, wherein the subset is used to detect the presence of objects.

8. The system of claim 1, wherein the processing circuitry is further configured to:
send a notification of the approaching animal to a vehicle access key or a nearby vehicle.

9. A method, comprising:
generating a navigational view based on a global positioning system (GPS) location of the vehicle;
receiving a user input selecting a predetermined area from the navigational view, wherein the predetermined area does not surround the vehicle;
receiving, from a second vehicle, over a network connection, an indication that a type of animal is approaching the predetermined area; and in response to determining that the type of animal is dangerous:

selecting, using the processing circuitry, a recommended vehicle deterrence feature of a plurality of vehicle deterrence features based on the type of animal; and facilitating, using the processing circuitry, activation of the recommended vehicle deterrence feature.

10. The method of claim 9, further comprising:

setting the predetermined area based on a vehicle access key associated with a user.

11. The method of claim 9, wherein the recommended vehicle deterrence feature comprises turning on one or more vehicle lights or causing a speaker to make a sound audible to the animal.

12. The method of claim 9, wherein the recommended vehicle deterrence feature comprises a first vehicle response and a second vehicle response, wherein facilitating activation of the recommended vehicle deterrence feature comprises:

activating the first vehicle response when the animal is a first distance away from the predetermined area, wherein the first vehicle response includes activation of vehicle lights or an audible sound from the vehicle; and activating the second vehicle response when the animal is a second distance, closer than the first distance, away from the predetermined area, wherein the second vehicle response includes activation of vehicle lights and an audible sound from the vehicle.

13. The method of claim 9, further comprising:

selecting a subset of available vehicle lights for turning on as the recommended vehicle deterrence feature based on a location of the animal.

14. The method of claim 9, further comprising:

selecting a subset of available sensors of the vehicle for use in detecting the presence of objects based on a location of the predetermined area.

15. The method of claim 9, further comprising:

sending a notification of the approaching animal to a vehicle access key or a nearby vehicle.

16. A system, comprising:

a plurality of sensors on a vehicle configured to monitor an environment surrounding a vehicle; and processing circuitry configured to:

receive data from the plurality of sensors;

determine a path trajectory of an animal in the environment surrounding the vehicle based on the data;

determine, based on the data, that the user is outside of a predetermined area;

in response to determining that the user is outside of the predetermined area, accessing location data for a vehicle access key of the user;

determine a path trajectory of a user in the environment surrounding the vehicle based on the location data for the vehicle access key;

determine whether the animal and user are approaching each other based on whether the respective path trajectory of the animal and the user intersect; and in response to determining that the animal and the user are approaching each other, send a notification of the animal to the vehicle access key of the user.

* * * * *